(12) United States Patent
Caceres et al.

(10) Patent No.: US 9,826,403 B2
(45) Date of Patent: Nov. 21, 2017

(54) PROTECTED SMART CARD PROFILE MANAGEMENT

(71) Applicant: Verizon Patent and Licensing Inc., Arlington, VA (US)

(72) Inventors: Manuel Enrique Caceres, Basking Ridge, NJ (US); Warren Hojilla Uy, Randolph, NJ (US); Nanjun Qian, Princeton, NJ (US); Axel Hallo De Wolf, Whippany, NJ (US); Ruben Cuadrat, New York, NY (US); John Markey, San Diego, CA (US); Taussif Khan, Monroe, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/131,197

(22) Filed: Apr. 18, 2016

(65) Prior Publication Data

US 2017/0280321 A1    Sep. 28, 2017

Related U.S. Application Data

(63) Continuation-in-part of application No. 15/079,547, filed on Mar. 24, 2016.

(51) Int. Cl.
*H04W 12/06* (2009.01)
*H04W 8/18* (2009.01)
*H04W 8/20* (2009.01)
*H04W 4/00* (2009.01)
*H04W 12/04* (2009.01)
*H04M 1/725* (2006.01)

(52) U.S. Cl.
CPC ........ *H04W 12/06* (2013.01); *H04M 1/72563* (2013.01); *H04W 4/001* (2013.01); *H04W 8/183* (2013.01); *H04W 8/205* (2013.01); *H04W 12/04* (2013.01)

(58) Field of Classification Search
CPC ..... H04W 12/06; H04W 12/04; H04W 8/183; H04W 8/205; H04W 4/001; H04M 1/72563
See application file for complete search history.

(56) References Cited

U.S. PATENT DOCUMENTS

| | | | |
|---|---|---|---|
| 2016/0105540 A1* | 4/2016 | Kwon | H04N 21/41407 715/747 |
| 2016/0157085 A1* | 6/2016 | Yeoum | H04M 3/387 455/435.1 |
| 2016/0277930 A1* | 9/2016 | Li | H04L 41/28 |
| 2016/0352698 A1* | 12/2016 | Long | H04W 4/003 |

* cited by examiner

*Primary Examiner* — Nam Huynh

(57) ABSTRACT

A device receives a request from a user to manage a Mobile Network Operator (MNO) profile stored in a smart card within the device, wherein the MNO profile includes one or more network access credentials for accessing a wireless network. The device performs a Completely Automated Public Turing Test to tell Computers and Humans Apart (CAPTCHA), wherein the CAPTCHA includes receiving input from the user, and authenticates the user as a human, and not a bot or other automated activity, based on the CAPTCHA and the input from the user. The device receives, from a network node external to the device responsive to the authenticating, a MNO profile management code, and manages the MNO profile based on the received MNO profile management code.

20 Claims, 28 Drawing Sheets

PROTECTED SMART CARD PROFILE MANAGEMENT

RELATED APPLICATION

The present application is a continuation-in-part (CIP) of U.S. application Ser. No. 15/079,547, entitled "Profile Deletion Codes in Subscription Management Systems" and filed Mar. 24, 2016, the disclosure of which is hereby incorporated by reference herein in its entirety.

BACKGROUND

Smart cards typically consist of pocket-sized, or smaller, cards with embedded integrated circuits. Memory cards and microprocessor cards are two categories of smart cards. Memory cards contain only non-volatile memory storage components. Microprocessor cards contain memory storage components and microprocessor components. Microprocessor smart cards are typically used with mobile devices, such as cellular telephones, and have both limited memory capacity and processing power relative to the memory and microprocessor contained in the mobile devices into which the smart cards are inserted.

Subscriber Identity Module (SIM), Universal Integrated Circuit Cards (UICCs), and Removable User Identity Module (R-UIM) cards are examples of microprocessor smart cards. SIM cards securely store an identifier or key used to identify a subscriber on mobile telephone devices (e.g., cellular radiotelephones). SIM cards enable users to change phones by removing the SIM card from one telephony device and inserting it into another telephony device. UICCs are smart cards used in mobile terminals in Global System for Mobile Communications (GSM) and Universal Mobile Telecommunications System (UMTS) networks. UICCs ensure the integrity and security of different types of personal data, and may include several applications that permit access to both GSM and UMTS networks. R-UIMs include cards having features that are usable with Code Division Multiple Access (CDMA), GSM and UMTS devices.

Typical UICCs are pre-installed, during the manufacturing process, with Mobile Network Operator (MNO) profiles which include the applications (e.g., applets) and credentials (e.g., keys) necessary for the mobile devices, into which the UICCs are inserted, to attach to particular MNO network(s). The MNO profiles, in typical UICCs, remain installed in the UICCs for the life cycle of the UICCs, and usually cannot be changed or deleted.

DETAILED DESCRIPTION OF THE PREFERRED EMBODIMENTS

Figure 1A:
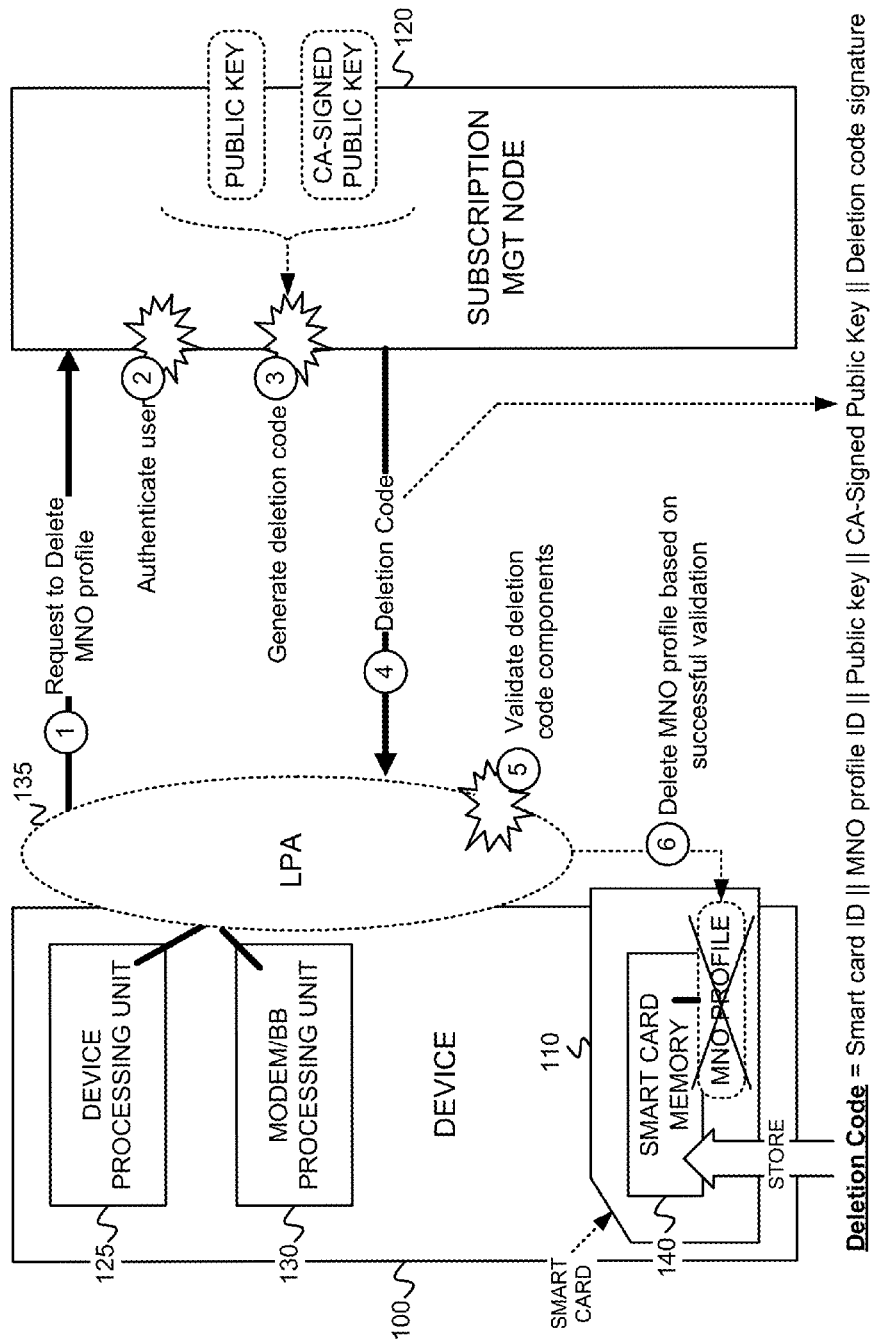
FIG. 1A is a diagram that depicts an overview of the delivery of a deletion code to a mobile device, validation of components of the delivered deletion code, and deletion of an MNO profile from a smart card at the mobile device based on results of the validation of the delivered deletion code.

The following detailed description refers to the accompanying drawings. The same reference numbers in different drawings may identify the same or similar elements. The following detailed description does not limit the invention.

The GSM Association (GSMA), via its embedded UICC (eUICC) initiative, seeks to allow the download of MNO profiles into UICCs subsequent to manufacturing. Within the GSMA specifications for consumers, there is a component called the Local Profile Assistant (LPA) that may reside in the application processor or the modem/baseband radio processor of the mobile device. The LPA serves to assist in the download of profiles to the eUICC. Per the GSMA specifications, the LPA can command the eUICC to switch a MNO profile, disable a MNO profile, delete a MNO profile, and/or download a MNO profile. The ability to download and change a MNO profile is also relevant for machine-to-machine (M2M) devices, and wearable wireless devices. In these types of devices, the eUICC is soldered directly onto the circuit board, preventing removal. Therefore, the ability to download and change MNO profiles in eUICCs in M2M and wearable wireless devices would be advantageous.

One of the most sensitive operations that the LPA can perform on the eUICC is MNO profile deletion. Since the MNO profile contains the necessary credentials to attach to the MNO network, if the MNO profile is deleted, an immediate denial of service will result. Deletion of the MNO profile would require the user to re-download the MNO profile. However, if the user does not have a network connection available to do this, then the denial of service will be catastrophic.

Since the LPA resides either in the application processor, or the modem/baseband radio processor, the security of the profile deletion command relies on the security controls in this environment. The application processor, however, is considered a hostile environment since the application processor is susceptible to "zero day" attacks, and also because the user may download malware. For example, downloaded malware can bypass the LPA, and send comments directly to the eUICC instructing the eUICC to delete the stored MNO profile. If this type of malware were to affect thousands of customers in a distributed manner, there is nothing that the MNO could do to stop it and denial of service to the customers could happen on a large scale.

Exemplary embodiments described herein propose a system that both captures user intent to delete a MNO profile, and ensures that the MNO carrier can protect the customer from malware deletion of their MNO profiles. The system described herein includes a decentralized approach that enables any GSMA-certified carrier to issue profile deletion codes. Therefore, the system described herein alleviates issues related to government regulations that require that hardware not be locked down to a specific carrier. The system described herein further uses CAPTCHA (Completely Automated Public Turing Test to tell Computers and Humans Apart) authentication techniques to thwart the manipulation of stored MNO profiles at a device by "bots," or by other automated entities. The CAPTCHA authentication techniques may include generating a random number, and a corresponding image of the random number, within a security domain of a smart card of a device, and passing the image of the generated random number to the LPA of the device. The LPA then distorts the image of the random number to produce a distorted CAPTCHA image that may be presented to the user of the device. If the user can provide the original random number in response to the presented CAPTCHA image, then the user is considered to be successfully CAPTCHA authenticated, and a profile management code (e.g., a profile deletion code) may be issued to the device associated with the user to enable profile management within the smart card of the device (e.g., MNO profile deletion).

FIG. 1A is a diagram that depicts an overview of the delivery of a deletion code to a device, validation of components of the delivered deletion code, and deletion of an MNO profile from a smart card at the device based on results of the validation of the delivered deletion code. As shown in FIG. 1A, a device 100 may have a smart card 110 within device 100 (i.e., interconnected with a smart card interface to connect to an internal system bus of the device 100). Smart card 110 may be removable from device 100 (e.g., insertable into a smart card interface of device 100, and removable out of the smart card interface of device 100), or may be permanently affixed and connected within device 100. Device 100 may include various types of devices, as described further with respect to FIGS. 2A and 2B below, that include, among other components, a device processing unit 125, a modem/baseband (BB) processing unit 130, and/or a smart card 110. Smart card 110 stores an MNO profile(s) which includes applications (e.g., applets) and credentials (e.g., keys) necessary for device 100 to attach to a particular MNO network(s) using wireless mechanisms.

A Local Profile Assistant (LPA) 135 may be executed by device processing unit 125 or by modem/BB processing unit 130 of device 100. In some implementations, LPA 135 may be executed by a processing unit (not shown) of smart card 110. LPA 135 includes one or more applications, resident in memory within device 100 or within a smart card memory 140 of smart card 110, that assists in the download of MNO profiles to smart card 110, requests deletion codes from a subscription management (mgt) node 120, and causes a current MNO profile stored in smart card memory 140 of smart card 110 to be deleted based on a deletion code received from subscription mgt node 120. LPA 135 additionally includes functionality for implementing a Local User Interface (LUI) and a Local Profile Download (LPD). Subscription mgt node 120, as described further below with respect to FIG. 2A, may include a network node in an external network, such as, for example, a MNO Public Land Mobile Network (PLMN) that performs, among other functions, subscription management functions related to subscribers of the MNO PLMN. In the exemplary implementation shown in FIG. 1A, one of the subscription management functions performed by subscription mgt node 120 may include customer/user authentication, and profile management code (e.g., deletion code) generation and issuance. As part of performing its subscription management functions, subscription mgt node 120 may obtain an asymmetric encryption key pair (e.g., a public/private key pair), generated using existing asymmetric encryption key generation techniques, and may, via Public Key Infrastructure (PKI) mechanisms, obtain a PKI certificate and a Certificate Authority (CA)-signed version of the public key from a PKI CA.

As depicted in FIG. 1A, LPA 135 may send a request (identified with a "1" within a circle) to delete the MNO profile from smart card 110, to subscription mgt node 120. The request may originate from LPA 135 based on intent of the customer/user 155 (FIG. 1B) of device 100 to delete the MNO profile. LPA 135 may determine the intent of the customer 155, for example, based on explicit manually entered user input into device 100 requesting deletion of the MNO profile stored in smart card 110. A request to delete a current MNO profile may, for example, occur when a current MNO profile is to be updated and/or replaced with a new/another MNO profile. Upon receipt of the request to delete the MNO profile, subscription mgt node 120 may authenticate (identified with a "2" within a circle) the customer/user 155 of device 100 and, if the authentication is successful, may generate (identified with a "3" within a circle) a deletion code. Various different existing techniques may be used to authenticate the customer/user 155 of device 100. A "deletion code," as referred to herein, includes a string of data that further includes multiple components concatenated together to create a single block of data, with the multiple components of the string of data being used, at LPA 135, as a basis for determining whether the MNO profile should be deleted. The "deletion code" may alternatively be referred to herein as a "profile management code"

that is used as a basis for determining whether any type of MNO profile management may be performed (e.g., profile deletion, profile enabling, profile disabling, profile downloading, etc.). Examples of the multiple components of the deletion code are described in further detail below.

Upon successful authentication of the customer/user of device 100, subscription mgt node 120 generates the deletion code. In one exemplary implementation, as shown in FIG. 1A, the deletion code may be generated by concatenating a smart card identifier (ID) associated with smart card 110, an MNO profile ID associated with the MNO profile to be deleted, the public key of subscription mgt node 120, the CA-signed public key received from the PKI CA, and a deletion code signature value. The deletion code signature value may be generated by taking a digital signature, using a private key of a public/private key pair, of multiple components of the deletion code. In one example, the deletion code signature may be generated by taking a signature over the data string that includes the smart card ID, the MNO profile ID, the public key, and the CA-signed public key all concatenated together. The resulting generated deletion code signature may be appended to the other components of the data string of the deletion code to produce the entire data string of the deletion code. Subscription mgt node 120 may issue (identified with a "4" within a circle) the generated deletion code to LPA 135 of device 100.

Upon receipt of the issued deletion code, LPA 135 may extract various ones of the components of the deletion code, and may validate the various components. For example, LPA 135 may extract the public key of subscription mgt node 120, the CA-signed public key, the deletion code signature, the smart card ID and the MNO profile ID. LPA 135 may validate (identified with a "5" within a circle) the public key, and the deletion code signature. LPA 135 may further validate the smart card ID and/or the MNO profile ID. LPA 135 may cause the MNO profile to be deleted (identified with a "6" within a circle) from smart card memory 140 of smart card 110 if the components of the issued deletion code are successfully validated. Subsequent to, or prior to, deletion of the MNO profile from smart card 110, LPA 135 may, for example, download an updated or new MNO profile, and may cause the updated or new MNO profile to be stored in memory 140 of smart card 110. As shown in FIG. 1A, once LPA 135 has validated the components of the deletion code, LPA 135 may cause the deletion code to be stored in smart card memory 140 for future use such as, for example, for deleting one or more subsequent, new or updated MNO profiles stored in smart card memory 140.

Figure 1B:
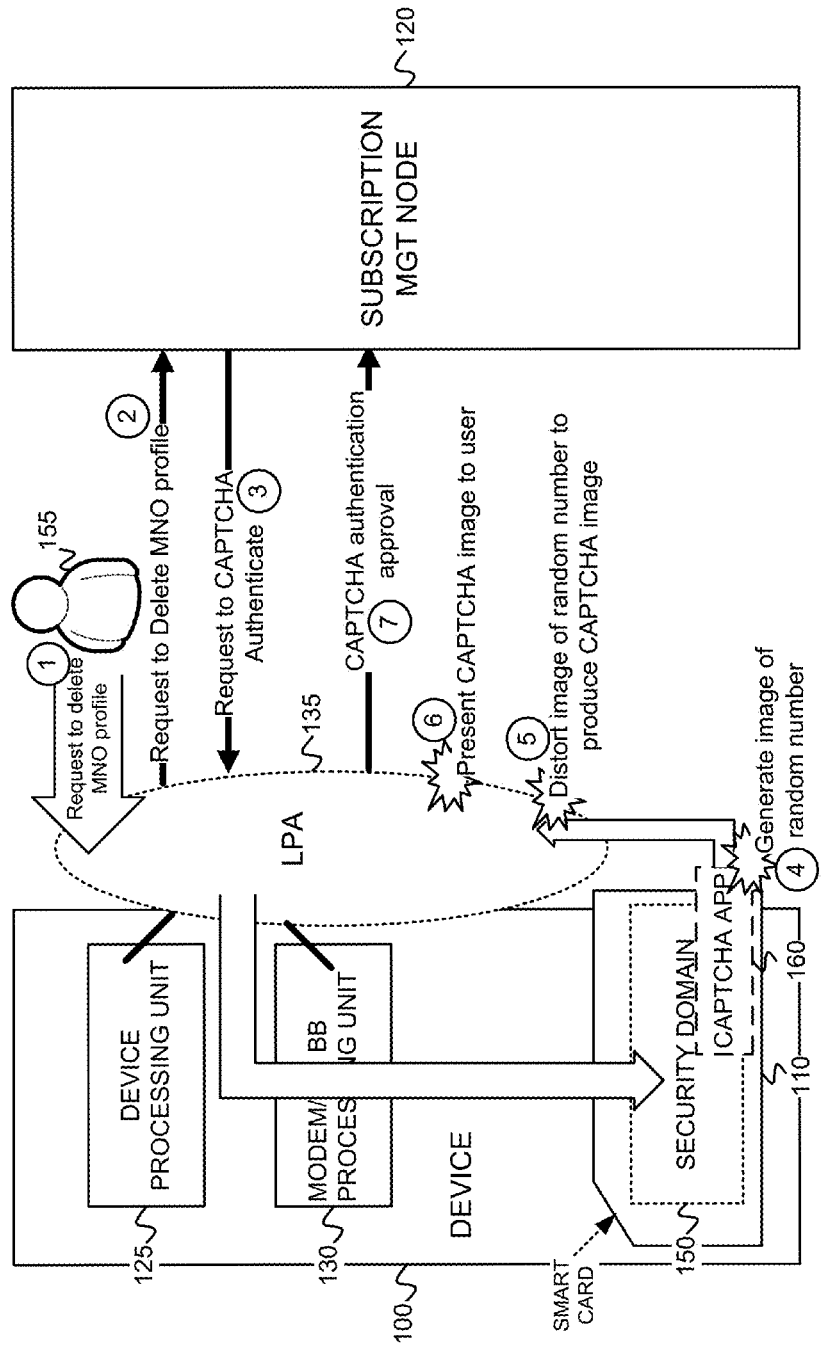
FIG. 1B is a diagram that depicts an overview of an exemplary embodiment in which Completely Automated Public Turing Test to tell Computers and Humans Apart (CAPTCHA) techniques may be used to thwart the manipulation of MNO profiles by bots at a device.

FIG. 1B is a diagram that depicts an overview of an exemplary embodiment in which CAPTCHA (Completely Automated Public Turing Test to tell Computers and Humans Apart) techniques may be used to thwart the manipulation of MNO profiles by bots, or other automated entities, at device 100. The exemplary operations depicted in FIG. 1B correspond to the request to delete (identified with a "1") and the user authentication (identified with a "2") operations shown in FIG. 1A.

As shown in FIG. 1B, LPA 135 of device 100 receives a request (identified with a "1" within a circle) to delete an MNO profile from a customer/user 155. The request to delete the MNO profile may originate with explicit, manually entered user input into device 100 requesting deletion of the MNO profile stored in smart card 110. The request to delete a current MNO profile may, for example, occur when a current MNO profile is to be updated and/or replaced with a new/another MNO profile. Upon receipt of the request from customer/user 155, LPA 135 may send a request to delete the MNO profile (identified with a "2" in FIG. 1B) to subscription management node 120 to request authorization from subscription management node 120 to delete (or otherwise manage) the MNO profile(s) stored in smart card memory 140 of smart card 110.

Upon receipt of the request to delete the MNO profile from LPA 135, subscription management node 120 sends a request to CAPTCHA authenticate (identified with a "3" in FIG. 1B) to LPA 135. LPA 135 passes the request to CAPTCHA authenticate via either modem/baseband processing unit 130 or device processing unit 125, to a security domain 150 of smart card 110. Security domain 150 includes a secure environment within smart card 110, implemented by operations performed by a smart card processing unit (not shown), that is secure from bots and/or other automated mechanisms occurring outside of smart card 110 within device 100. Upon receipt of the request to CAPTCHA authenticate within security domain 150 of smart card 110, the request is passed to a CAPTCHA app 160 executing within security domain 150. CAPTCHA app 160 includes a program (e.g., an applet) that is stored within smart card memory 140 and executed by a smart card processing unit (not shown in FIG. 1B).

CAPTCHA app 160 generates (identified with a "4" in FIG. 1B) an image of a random number. CAPTCHA app 160 performs an algorithm for generating a random number (e.g., a pseudo-random number generating algorithm), and performs another algorithm for generating an image (e.g., bit map (bmp), graphics interchange (gif), Joint Photographic Experts Group (jpg), etc.) that depicts the generated random number. CAPTCHA app 160 passes the generated image of the random number to LPA 135 via security domain 150, and via either modem/baseband processing unit 130 or device processing unit 125.

LPA 135, upon receipt of the generated image of the random number from security domain 150 of smart card 110, performs an algorithm to distort (identified with a "5" within FIG. 1B) the image of the random number to produce a distorted CAPTCHA image. LPA 135 may use various different algorithms for distorting the image of the random number in a manner that is intended to prevent bots, or other automated mechanisms, from identifying the random number depicted within the CAPTCHA image. LPA 135 causes the CAPTCHA image to be presented to user/customer 155 via, for example, a display of device 100 (identified with a "6" within FIG. 1B). LPA 135 receives, via a user interface of device 100, a response by user/customer 155 to the CAPTCHA image, where the response includes a correct identification of the random number displayed in the distorted CAPTCHA image. LPA 135, upon correct identification of the random number by user/customer 155, sends a CAPTCHA authentication approval message (identified with a "7" in FIG. 1B) to subscription management node 120. Subscription management node 120 may then, upon receipt of the CAPTCHA authentication approval message, proceed with the subsequent operations depicted in FIG. 1A (e.g., operations identified with a "3," "4," "5," and/or "6").

Figure 2A:
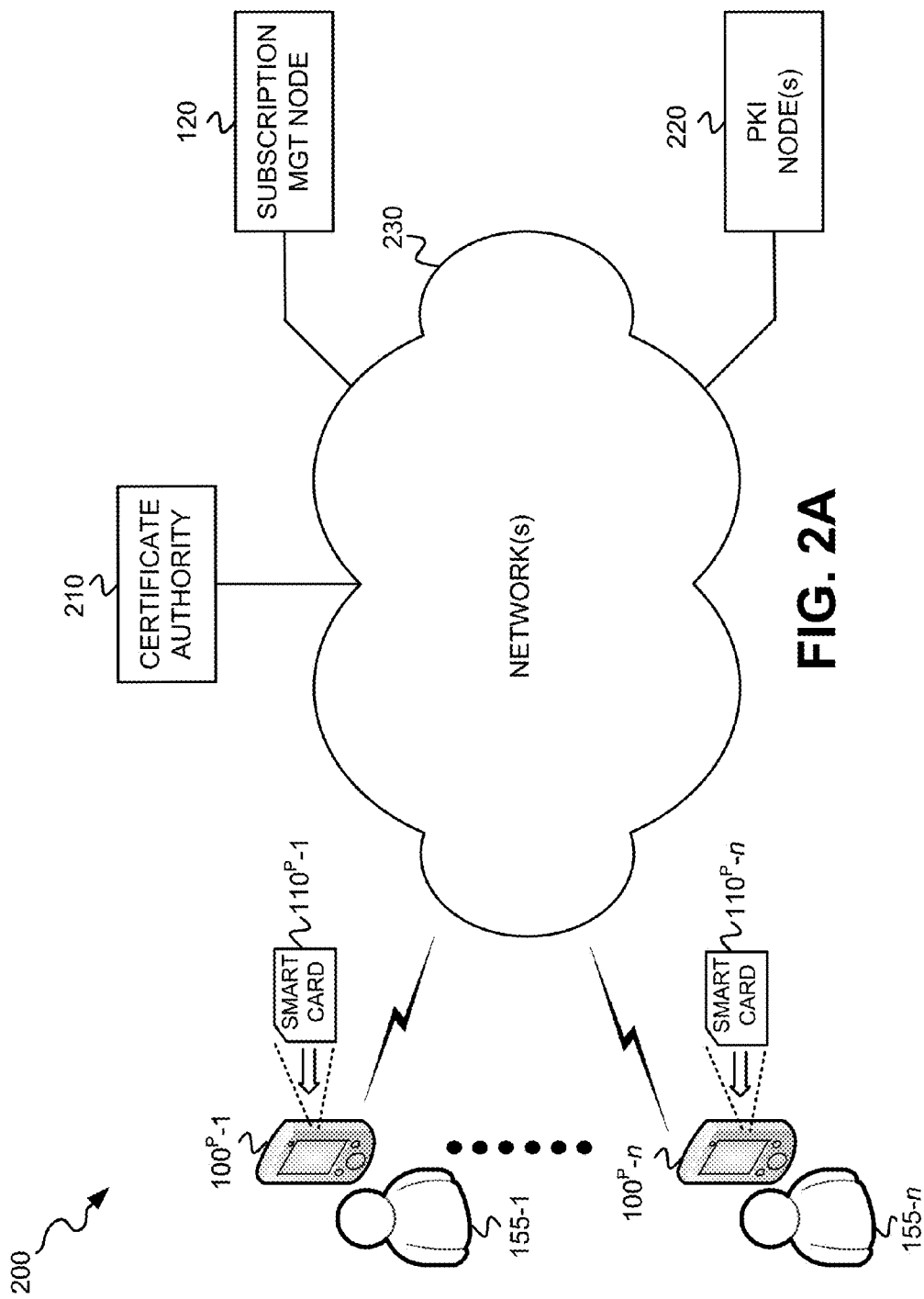
FIG. 2A is a diagram that depicts an exemplary network environment in which deletion codes are delivered to devices for the purpose of enabling the deletion of MNO profiles from the smart cards at the devices.

FIG. 2A is a diagram that depicts an exemplary network environment 200 in which deletion codes are delivered to devices, subsequent to CAPTCHA authentication, for the purpose of enabling MNO profile management within smart cards of the devices (e.g., deletion of MNO profiles from the smart cards of the devices). Network environment 200 includes primary devices $100^P$-1 through $100^P$-n, where n is greater than or equal to one, PKI certificate authority 210 (referred to herein as "certificate authority 210," "CA 210,"

or "CA"), subscription management (MGT) node 120, PKI node(s) 220, and network(s) 230.

Primary devices $100^P$-1 through $100^P$-n (generically referred to herein as "primary device $100^P$," "device 100," "primary devices $100^P$," or "devices 100") each includes an electronic device that further includes an interface for receiving and interconnecting with a respective one of microprocessor smart cards $110^P$-1 through $110^P$-n (generically referred to herein as "smart card $110^P$," "smart card 110," "smart cards $110^P$," or "smart cards 110"), and which also includes a wireless interface for communicating via network(s) 230. Primary device $100^P$ may include, for example, a cellular radiotelephone, a smart phone, a personal digital assistant (PDA), a wearable computer, a palm-top or tablet computer, or a media player. Primary device $100^P$ may, however, include any type of electronic device that may include a smart card 110 and a wireless communication interface.

Smart card 110 includes any type of microprocessor smart card capable of being interconnected with device 100 (e.g., inserted into device $100^P$). Smart card 110 may, for example, include a small microprocessor smart card embedded with a memory storage component(s) and a microprocessor component(s). Smart card 110 may include a Subscriber Identity Module (SIM), a Universal Integrated Circuit Card (UICC), an embedded UICC (eUICC), or a Removable User Identity Module (R-UIM) card which store an MNO profile, in addition to other applications and/or data. Smart card 110 may securely store an identifier (e.g., a Mobile Directory Number (MDN)) and/or key used to identify a subscriber on mobile devices (e.g., cellular radiotelephones). Other types of microprocessor smart cards, not described herein, may be used for smart card 110.

Certificate authority 210 includes one or more network devices that act as a node in a Public Key Infrastructure (PKI) system for generating and issuing a digital identity certificate requested by a device 100, and for signing a public key of subscription mgt node 120 and issuing a CA-signed version of the public key to subscription mgt node 120.

Subscription mgt node 120 includes one or more network devices that, based on receipt of a request to delete an MNO profile at a device 100, authenticate a customer/user of the device 100, and generate and issue a deletion code, as described further herein, based on successful authentication of the customer/user (e.g., successful CAPTCHA authentication, as described herein). In one exemplary implementation, subscription mgt node 120 may include the Subscription Manager-Data Preparation (SM-DP) node of a Public Land Mobile Network (PLMN).

PKI node(s) 220 includes one or more other nodes of the PKI system that, in conjunction with certificate authority 210, bind user public keys with respective user identities and assist in the creation, management, distribution, storage and revocation of digital identity certificates. PKI node(s) 220 may include, for example, a registration authority (RA) that verifies the identity of customers/users requesting information from the certificate authority.

Network(s) 230 includes one or more networks of any type, such as, for example, a telecommunications network (e.g., a Public Switched Telephone Network (PSTN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a GSM PLMN, a Long Term Evolution (LTE) PLMN and/or other types of PLMNs not specifically described herein. In one implementation, network(s) 230 may include a PLMN connected to one or more other networks (e.g., the Internet). For example, in this implementation, subscription mgt node 120 may include a network device resident in the PLMN.

The configuration of the components of network environment 200 depicted in FIG. 2A is for illustrative purposes only. It should be understood that other configurations may be implemented. Therefore, network environment 200 may include additional, fewer and/or different components, that may be configured differently, than depicted in FIG. 2A.

Figure 2B:
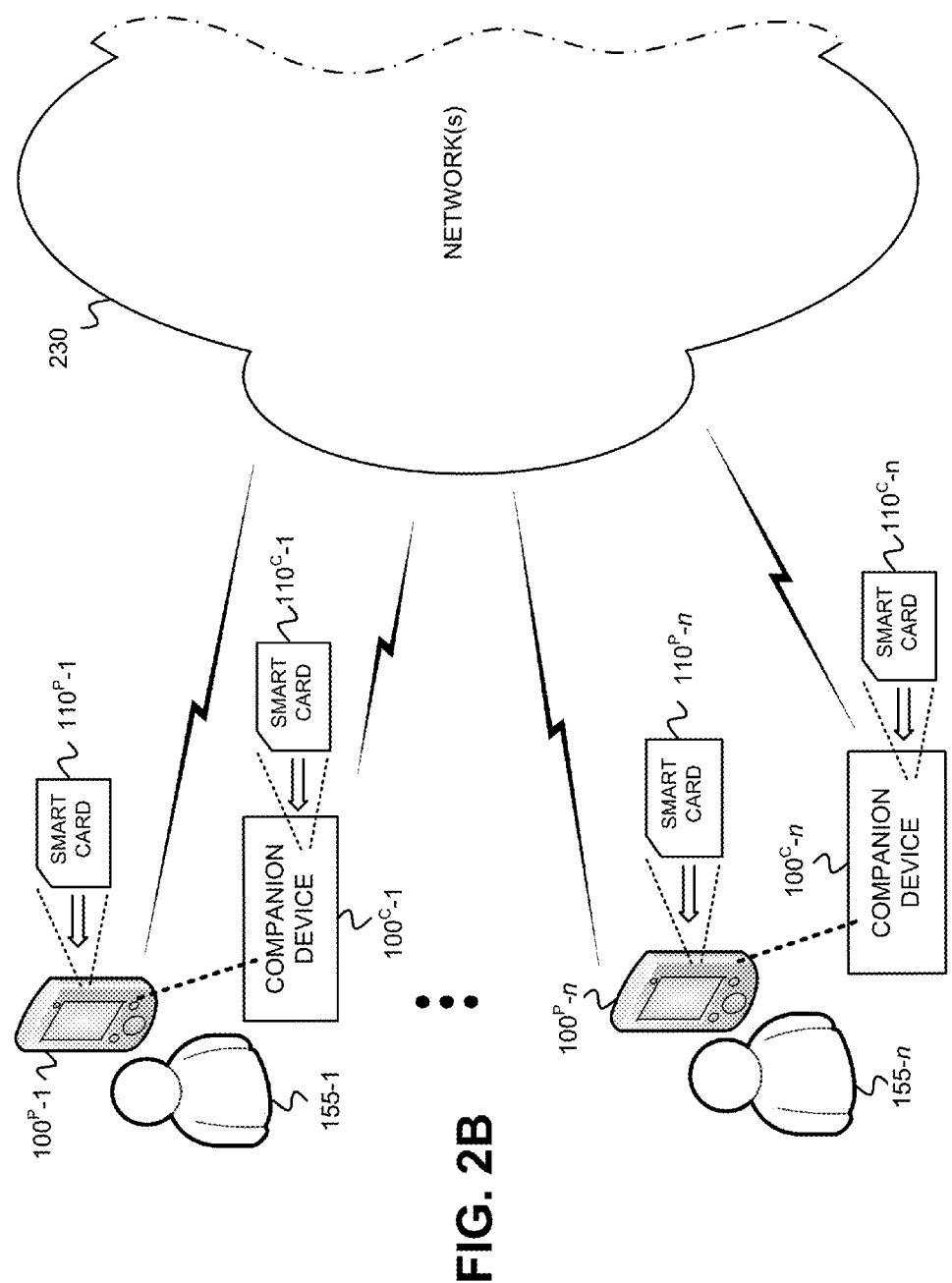
FIG. 2B depicts a portion of the network environment of FIG. 2A in an exemplary implementation in which companion devices are associated with the primary devices of FIG. 2A and where the companion devices include respective smart cards.

FIG. 2B depicts a portion of the network environment 200 of FIG. 2A in an exemplary implementation in which companion devices $100^C$-1 through $100^C$-n are associated with respective primary devices $100^P$-1 through $100^P$-n and where companion devices $100^C$-1 through $100^C$-n may include respective ones of smart cards $110^C$-1 through $110^C$-n. Each of companion devices $100^C$-1 through $100^C$-n may include an interface for receiving and interconnecting with a respective one of smart cards $110^C$-1 through $110^C$-n (generically referred to herein as "smart card $110^C$," "smart cards $110^C$," "smart card 110," or "smart cards 110"). As shown in FIG. 2B, each of companion devices $100^C$-1 through $100^C$-n may include its own wireless interface for communicating via network(s) 230. As referred to herein, "smart card $110^P$" corresponds to a smart card 110 inserted into, or disposed within (or otherwise associated with), a primary device $100^P$, and "smart card $110^C$" corresponds to a smart card 110 inserted into, or disposed within (or otherwise associated with), a companion device $100^C$.

Companion devices $100^C$-1 through $100^C$-n (generically referred to herein as "companion device $100^C$," "device 100," "companion devices $100^C$," or "devices 100") each includes a secondary electronic device that connects to, and communicates with, a respective one of primary devices $100^P$-1 through $100^P$-n. Each companion device $100^C$ may connect to a respective primary device $100^P$ via a wired or wireless connection. The wireless connection include, for example, a Bluetooth connection (i.e., compliant with Bluetooth SIG standards), a Wi-Fi connection (i.e., compliant with IEEE 802.11 standards), a Near Field Communication (NFC) connection (i.e., compliant with ECMA-340 and ISO/IEC 18092 standards), an Insteon connection, an Infra-red Data association (IrDA) connection, a wireless Universal Serial Bus (USB) connection, a Z-Wave connection, a ZigBee connection (i.e., compliant with the IEEE 802.15.4 standard), or a Body Area Network connection (i.e., compliant with the IEEE 802.15.6 standard). A Bluetooth connection may include use of short-wavelength Ultra-High Frequency (UHF) radio waves in the Industrial, Scientific and Medical (ISM) radio bands from 2.4 to 2.485 GHz. A Wi-Fi connection may include use of 2.4 GHz UHF and/or 5 GHz Super High Frequency (SHF) ISM radio bands. Companion device $100^C$ may include any type of electronic device that is capable of communicating with primary device $100^P$ via a wired or wireless connection, such as, for example, a "smart" device. Companion device $100^C$ may include, for example, a "smart" wearable device (e.g., a "smart" watch, "smart" glasses, a "smart" wristband, a "smart" key chain, a "smart" ring, a "smart" necklace, etc.).

In one implementation, companion device $100^C$ may include an electronic device that includes an interface for interconnecting with its own microprocessor smart card $110^C$, and a wireless interface for communicating via network(s) 230. In another implementation, companion device $100^C$ may not include a display device such that companion device $100^C$ must use a display of primary device $100^P$ for operations requiring the display of information to user/customer 155. In a further implementation, companion device $100^C$ may not include a smart card $110^C$ and may not have a wireless interface for communicating via network(s) 230. In yet another implementation, companion device $100^C$ may include a smart card $110^C$ and may have a wireless interface for communicating via network(s) 230, but the smart card 110 may be insufficiently powerful (e.g., inadequate smart card processing unit and/or inadequate smart card memory) for executing applications (e.g., applets), such as, for example, CAPTCHA application 160 depicted in FIG. 1B.

Microprocessor smart cards $110^C$-1 through $110^C$-n each includes any type of microprocessor smart card capable of being interconnected with companion device $100^C$ (e.g., inserted into companion device $100^C$). Smart card $110^C$ may, for example, include a small microprocessor smart card embedded with a memory storage component(s) and a microprocessor component(s). Smart card $110^C$ may include a SIM, a UICC, an eUICC, or a R-UIM card which store an MNO profile, in addition to other applications and/or data. Other types of microprocessor smart cards, not described herein, may be used for smart card $110^C$.

Figure 3:
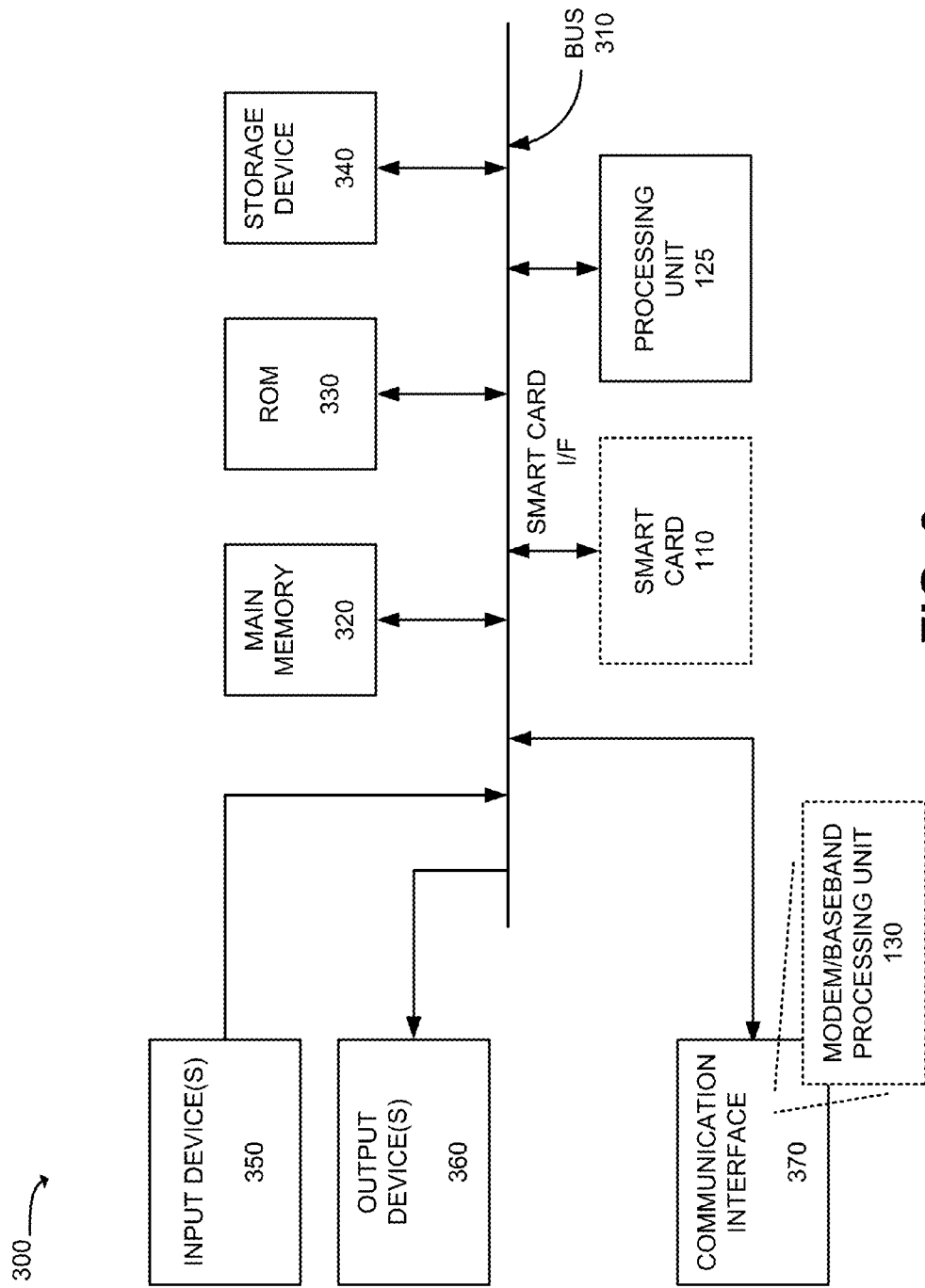
FIG. 3 is a diagram of exemplary components of a device that may correspond to the devices, the certificate authority, the subscription management node, and the Public Key Infrastructure node(s) of FIGS. 2A and 2B.

FIG. 3 is a diagram of exemplary components of a device 300. Primary devices $100^P$, companion devices $100^C$, certificate authority 210, subscription mgt node 120, and PKI node(s) 220 may each include the same, or similar components, in a same or similar configuration to that depicted in FIG. 3.

Device 300 may include a bus 310, a processing unit 125, a main memory 320, a read only memory (ROM) 330, a storage device 340, an input device(s) 350, an output device(s) 360, and a communication interface 370. Bus 310 may include a path that permits communication among the elements of device 300. As further shown in FIG. 3, in the case of device 300 being primary device $100^P$ and/or companion device $100^C$, smart card 110 may be interconnected with a smart card interface (I/F) of device 100 that further connects to bus 310. As also shown in FIG. 3, in the case of device 300 being primary device $100^P$ and/or companion device $100^C$, communication interface 370 may include a modem/baseband processing unit 130. Modem/baseband processing unit 130 includes a device (e.g., a chip or portion of a chip) that manages wireless communication functions such as, for example, radio functions that involve communication via an antenna. Modem/baseband processing unit 130 may, in one implementation, include its own memory and firmware.

Processing unit 125 may include a processor, microprocessor, or processing logic that may interpret and execute instructions. Main memory 320 may include a random access memory (RAM) or another type of dynamic storage device that may store information and instructions for execution by processing unit 125. ROM 330 may include a ROM device or another type of static storage device that may store static information and instructions for use by processing unit 125. Storage device 340 may include a magnetic and/or optical recording medium and its corresponding drive. Main memory 320, ROM 330 and storage device 340 may each be referred to herein as a "tangible non-transitory computer-readable medium."

Input device 350 may include one or more mechanisms that permit a user or operator to input information to device 300, such as, for example, a keypad or a keyboard, a display with a touch sensitive panel, voice recognition and/or biometric mechanisms, etc. Output device 360 may include one or more mechanisms that output information to the operator or user, including a display, a speaker, etc. Input device 350 and output device 360 may, in some implementations, be implemented as a graphical user interface (GUI) that displays GUI information and which receives user input via the GUI. Communication interface(s) 370 may include one or more transceivers that enable device 300 to communicate with other devices and/or systems. For example, communication interface(s) 370 may include wired and/or wireless transceivers for communicating via network(s) 230. If device 300 is a primary device $100^P$ and/or a companion device $100^C$, then communication interface(s) 370 may include a wireless transceiver (including one or more antennas) for communicating via a PLMN using modem/baseband processing unit 130.

Device 300 may perform certain operations or processes, as may be described in detail below. Device 300 may perform these operations in response to processing unit 125 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via communication interface 370. The software instructions contained in main memory 320 may cause processing unit 125 to perform operations or processes that will be described later. Alternatively, hard-wired circuitry may be used in place of or in combination with software instructions to implement processes described herein. Thus, exemplary implementations are not limited to any specific combination of hardware circuitry and software.

The configuration of components of device 300 illustrated in FIG. 3 is for illustrative purposes only. It should be understood that other configurations may be implemented. Therefore, device 300 may include additional, fewer and/or different components, arranged in a different configuration, than depicted in FIG. 3.

Figure 4:
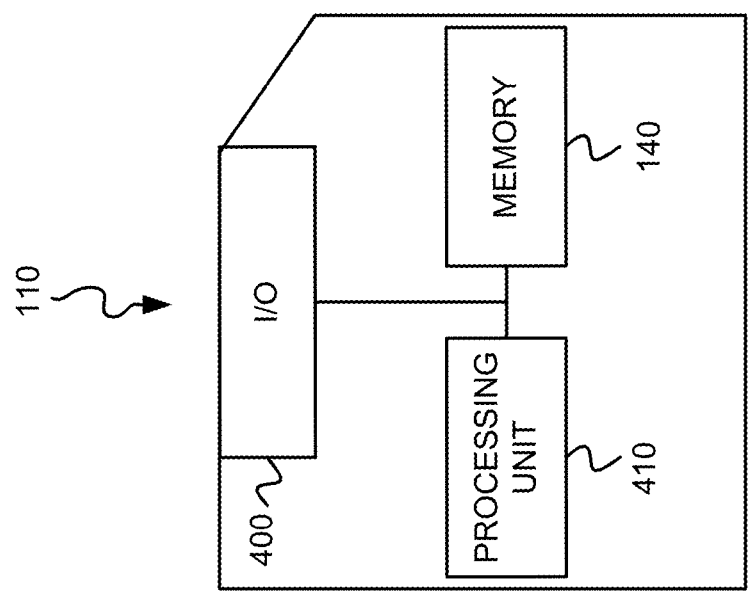
FIG. 4 is a diagram that depicts exemplary components of a smart card of FIGS. 1A, 1B, 2A and 2B.

FIG. 4 is a diagram that depicts exemplary components of smart card 110. Smart card 110 may include input/output circuitry 400, a processing unit 410, and a memory 140. Input/output circuitry 400 may include circuitry for inputting data to smart card 110 from device 100 (e.g., via bus 310), and output circuitry for outputting data from smart card 110 to device 100 (e.g., via bus 310). Processing unit 410 may include a processor, microprocessor, or processing logic that may interpret and execute instructions. Memory 140 may include RAM, ROM, and/or Electrically Erasable Programmable Read-Only Memory (EEPROM) that may store data, and may store instructions for execution by processing unit 410.

Smart card 110 may perform certain operations or processes. Smart card 110 may perform these operations in response to processing unit 410 executing software instructions contained in a non-transitory computer-readable storage medium, such as smart card memory 140. The configuration of components of smart card 110 illustrated in FIG. 4 is for illustrative purposes only. It should be understood that other configurations may be implemented. Therefore, smart card 110 may include additional, fewer and/or different components, arranged in a different configuration, than depicted in FIG. 4.

Figure 5:
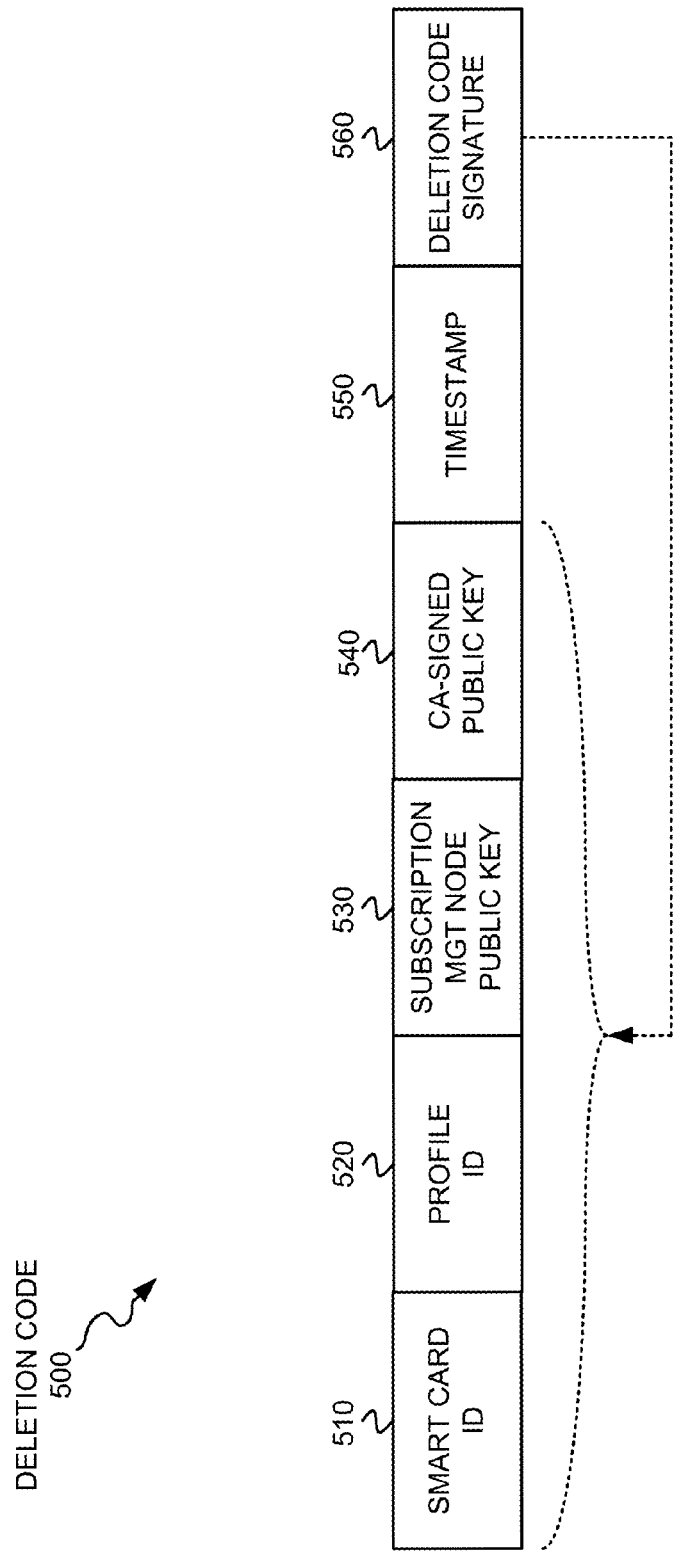
FIG. 5 depicts exemplary components of a profile deletion code that may be generated by the subscription management node of FIG. 2A.

FIG. 5 depicts exemplary components of a profile deletion code 500 (referred to herein as "deletion code 500") that may be generated by subscription mgt node 120. Deletion code 500 may include a string of data whose concatenated components or data include smart card identifier (ID) data 510, profile ID data 520, a subscription mgt node public key 530, a certificate authority-signed public key 540, timestamp data 550, and a deletion code signature 560. The component data 510-560 may each be encoded using various different types of encoding schemes. In one implementation, each component 510-560 of deletion code 500 may be encoded using Type-Length-Value (TLV) encoding.

Smart card ID data 510 includes data that uniquely identifies a smart card 110 in which the MNO profile is stored that is to be deleted based on deletion code 500. In one exemplary implementation, smart card ID data 510 may include data that identifies the eUICC ID (EID) of smart card 110. Profile ID data 520 includes data that uniquely identifies the MNO profile that is to be deleted based on deletion code 500. In one exemplary implementation, profile ID data 520 includes a unique number (e.g., the Integrated Circuit Card ID (ICCID)) that identifies the operational MNO profile in a eUICC.

Subscription mgt node public key 530 includes a public key of subscription mgt node 120, where the public key is part of a public/private asymmetric encryption key pair obtained by subscription mgt node 120. CA-signed public key 540 includes a version of the public key of subscription mgt node public key data 530 that has been signed by certificate authority 210 of the PKI system.

Timestamp data 550 includes data that identifies a current time at which deletion code 500 is generated and issued to a LPA 135 of a mobile device 100. The current time may, for example, include a Universal Time, Coordinated (UTC). Timestamp data 550 may be optional such that, in some implementations, timestamp data 550 is not included within deletion code 500.

Deletion code signature 560 includes a digital signature applied, using the subscription mgt node 120's private key of the public/private key pair and a signature generation algorithm, over multiple components of deletion code 500. In one implementation, the digital signature may be applied or executed, using the private key, over data 510, 520, 530, and 540 (and, optionally, timestamp 550) of deletion code 500. Upon generation of the digital signature, the digital signature may be appended, as data 560, to deletion code 500.

The data contents of deletion code 500, shown in FIG. 5, are for illustrative purposes. Deletion code 500 may include a different number, type, or content of data of the various components of the string of data, and/or may be arranged in a different order, than that shown in FIG. 5.

FIGS. 6A-6D are flow diagrams illustrating an exemplary process for obtaining a profile deletion code, to enable a MNO profile to be deleted at a device 100, based on CAPTHCA authentication of user/customer 155. The exemplary process of FIGS. 6A-6D may be implemented by processing unit 125 of device 100 (either primary device 100$^P$ or companion device 100$^C$), in conjunction with processing unit 410 of smart card 110. The exemplary process of FIGS. 6A-6D is described with reference to the exemplary messaging diagram of FIGS. 7A and 7B.

Figure 7A:
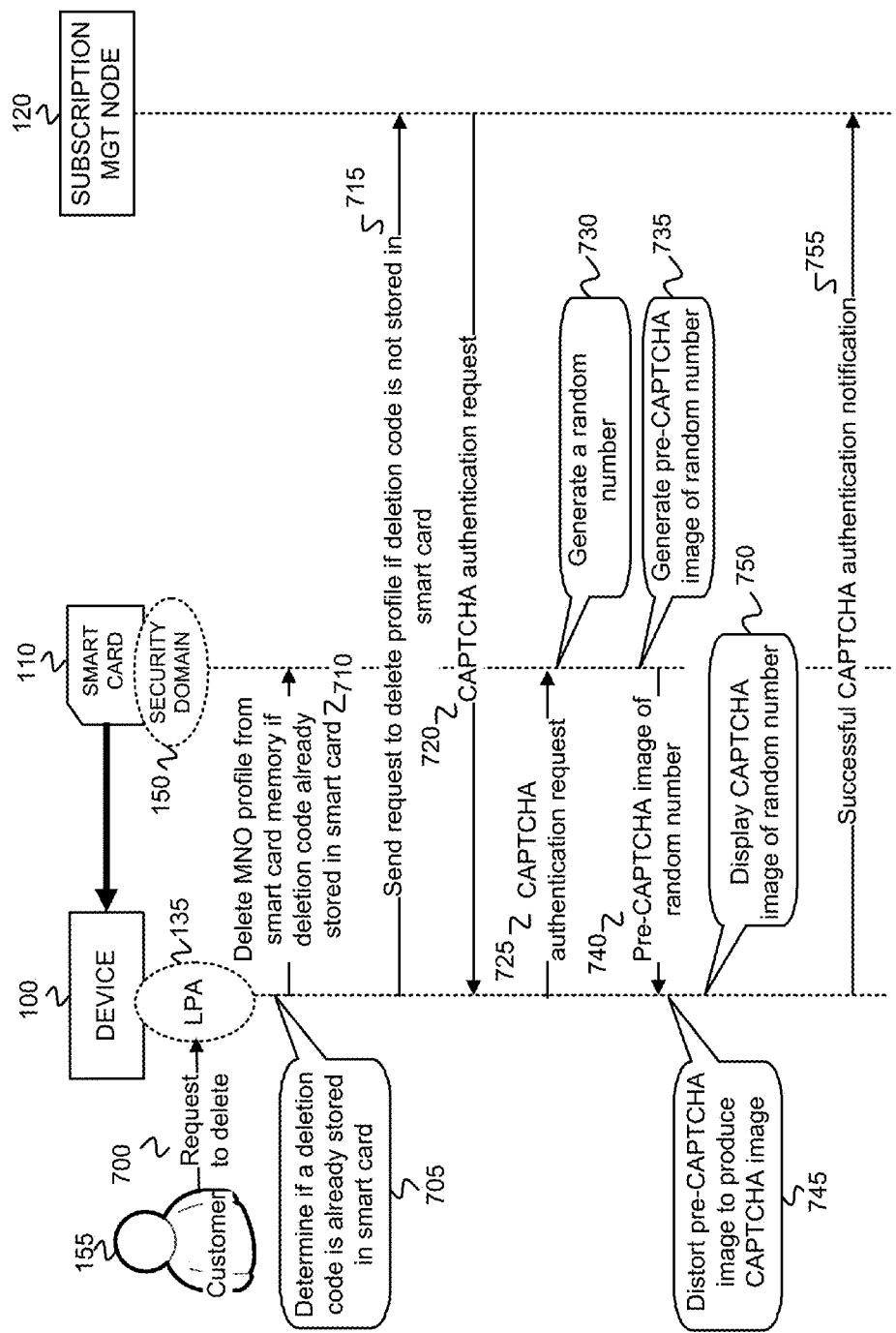
FIGS. 7A and 7B are messaging diagrams associated with the exemplary process of FIGS. 6A-6D.

The exemplary process includes LPA 135 of device 100 receiving a customer request to delete the customer's MNO profile from storage at device 100 (block 600). The customer/user 155 may wish to download a new or updated MNO profile and may provide input into device 100 requesting deletion of the current MNO profile. The customer/user 155 may, for example, apply user input via a touch screen display of input device(s) 350 of device 100 that requests, either explicitly or implicitly, deletion of the current MNO profile. As an example, if the customer/user 155 of device 100 requests the download of a new MNO profile, then the current MNO profile must first be deleted so that the request to download the new MNO profile is taken as an implicit request by the customer/user to delete the current MNO profile. FIG. 7A depicts customer 155 providing a request 700 to delete the current MNO profile to device 100.

LPA 135 at device 100 determines if a deletion code is already stored in smart card 110 (block 603). Upon receipt of the request to delete the current MNO profile, LPA 135 sends an inquiry to smart card 110 requesting a determination as to whether there already is a deletion code stored in smart card memory 140 of smart card 110. For example, a deletion code may have been delivered to smart card 110 by the manufacturer and stored in smart card memory 140. As another example, the customer/user 155 of device 100 may have used a camera of device 100 to scan a Quick Response (QR) code that encodes a deletion code, and the decoded deletion code may have been stored in smart card memory 140. As a further example, device 100 may have been placed in proximity to a deletion code delivery device that transmits, via Near Field Communication (NFC) protocols, a deletion code to device 100 where it is then stored in smart card memory 140. FIG. 7A depicts LPA 135 of device 100 determining 705 if a deletion code is already stored in the smart card 110 of device 100.

Smart card 110, subsequent to a memory lookup in smart card memory 140, replies with an indication that the deletion code is, or is not, already stored in memory 140. If the deletion code is already stored in memory 140 of smart card 110 (YES—block 603), then the exemplary process continues at block 655 (FIG. 6D) below with the deletion of the MNO profile from smart card memory 140. FIG. 7A depicts LPA 135 deleting 710 the current MNO profile from smart card memory 140 if a deletion code is already stored in smart card 110. If a deletion code is not already stored in smart card 110 (NO—block 603), then LPA 135 at device 100 sends a request to delete the MNO profile to subscription mgt node 120 (block 605). In one implementation, the request to delete the MNO profile may include the smart card ID of the smart card 110 of the device 100, and/or the profile ID of the current MNO profile. FIG. 7A depicts LPA 135 at device 100 sending 715 a request to delete the MNO profile to subscription mgt node 120 if a deletion code is not already stored in smart card memory 140 of smart card 110. Upon receipt of the request for the deletion code, subscription mgt node 120 authenticates the customer/user 155, and responds with a CAPTCHA authentication request, as described with respect to the exemplary process of FIGS. 9A and 9B below.

LPA 135 of device 100, in response to the request for a deletion code, receives a CAPTCHA authentication request from subscription mgt node 120 (block 607), and passes the CAPTCHA authentication request, via device processing unit 125 or modem/baseband processing unit 130, to device 100's smart card security domain 150 (block 610). FIG. 7A depicts device 100 receiving a CAPTCHA authentication request 720 from subscription management node 120, and LPA 135 passing the CAPTCHA authentication request 725 to security domain 150 of smart card 110.

CAPTCH app 160, executing within smart card security domain 150, generates a random number (block 613), and generates an image of the random number to produce a pre-CAPTCHA random number image (block 615). Various different types of random number generating algorithms may be used by CAPTCHA app 160 to generate the random number. CAPTCHA app 160 may generate various different types of images (e.g., bmp, jpg, gif, etc.) for depicting the generated random number. FIG. 7A depicts the generation 730 of the random number, and the generation 735 of a pre-CAPTCHA image of the random number, within security domain 150 of smart card 110.

Figure 8:
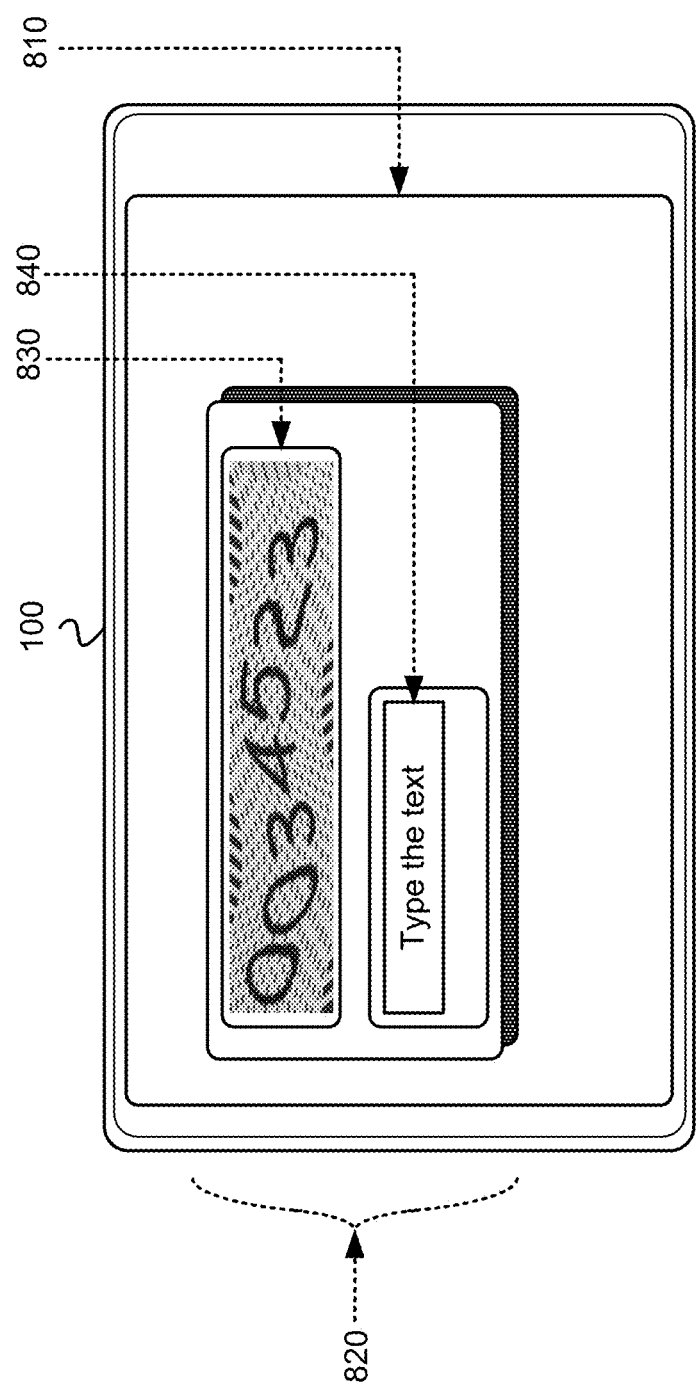
FIG. 8 depicts an example of a distorted CAPTCHA image of a random number being displayed to a user/customer via a display of a device.

CAPTCHA app 160, in device 100's smart card security domain 150, passes the pre-CAPTCHA random number image to LPA 135 (block 617), and LPA 135 of device 100 distorts the received pre-CAPTCHA random number image to produce a CAPTCHA image (block 620). LPA 135 sends the distorted CAPTCHA image to device 100's user interface (UI) for display to customer/user 155 (block 623). Device 100 displays the distorted CAPTCHA image and receives a user CAPTCHA response based on the displayed CAPTCHA image (block 625). FIG. 7A depicts smart card 110 passing 740 the pre-CAPTCHA image of the random number, LPA 135 at device 100 distorting 745 the pre-CAPTCHA image to produce a CAPTCHA image, and displaying 750 the distorted CAPTCHA image of the random number at device 100 to customer/user 155. User/customer 155 may, upon viewing the distorted CAPTCHA image of the random number, enter, via a user interface of device 100, the random number. FIG. 8 depicts an example of a distorted CAPTCHA image of a random number being displayed to user/customer 155 via a display 810 of device 100. As shown in FIG. 8, a CAPTCHA response window 820 may be displayed in display 810 of device 100, wherein CAPTCHA response window 820 presents the CAPTCHA image 830 that includes the distorted image of the random number, and a CAPTCHA response box 840 that permits user/customer 155 to supply the random number presented via CAPTCHA image 830.

LPA 135, based on the received user CAPTCHA response, determines if the user/customer 155 has been successfully CAPTCHA authenticated (block 627). Referring again to the example of FIG. 8, if user/customer 155 enters the correct number in CAPTCHA response box 840 that corresponds exactly to the random number depicted via distorted CAPTCHA image 830, then user/customer 155 is considered to be successfully CAPTCHA authenticated (i.e., is not a bot, or other automated entity). If LPA 135 determines that user/customer 155 has failed to successfully CAPTCHA authenticate (NO—block 627), then LPA 135 does not cause the MNO profile to be deleted from smart card memory 140 (block 630). If LPA 135 determines that user/customer 155 has successfully CAPTCHA authenticated (YES—block 627), then LPA 135 sends a successful CAPTCHA authentication notification to subscription mgt node 120 (block 635). FIG. 7A depicts LPA 135 at device 100 sending a successful CAPTCHA authentication notification 755 to subscription mgt node 120.

Figure 7B:
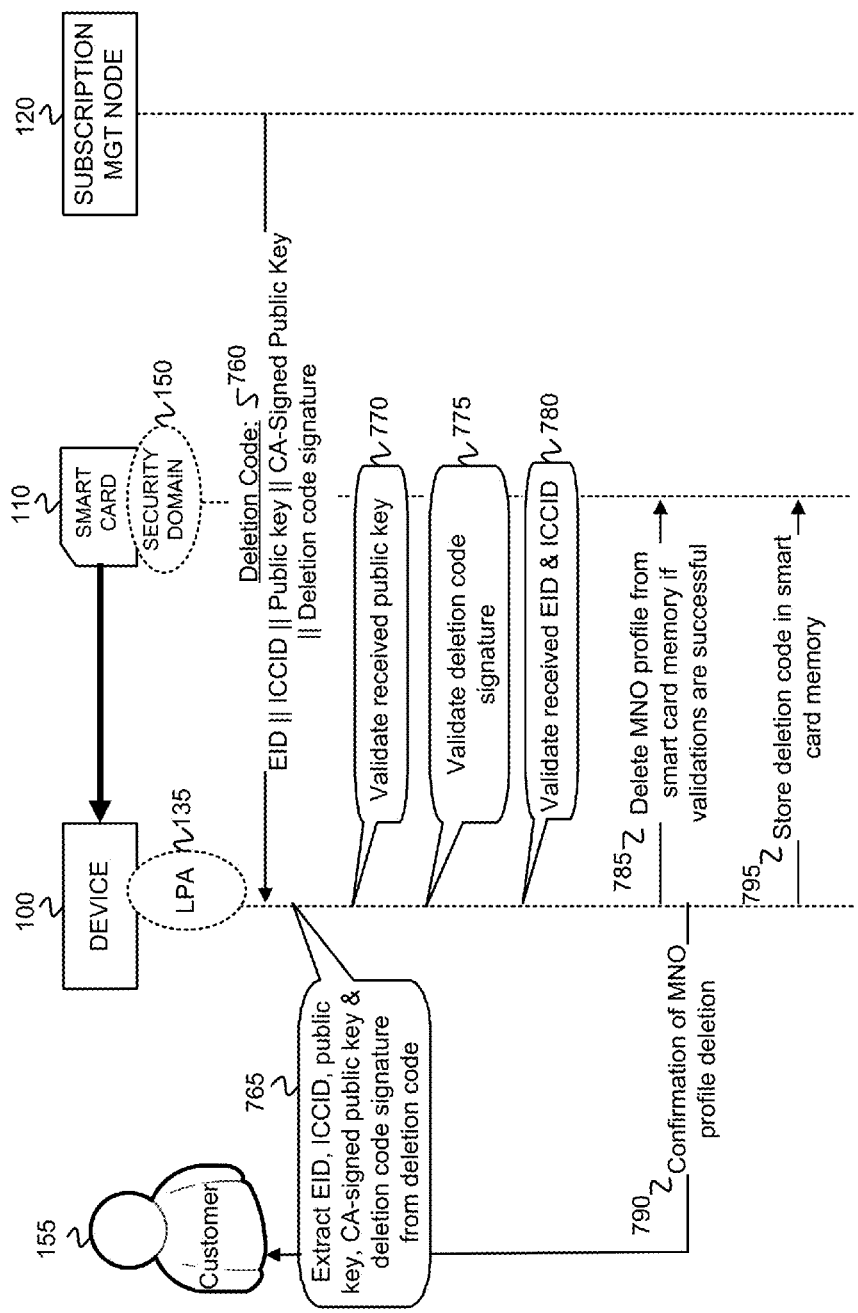

LPA 135 at device 100, in response to the successful CAPTCHA authentication notification, receives a deletion code issued from subscription mgt node 120 (block 638). The deletion code generated by subscription mgt node 120 may include multiple components as described above with respect to the deletion code 500 of FIG. 5. As depicted in FIG. 7B, the deletion code 760 generated by subscription mgt node 120 may include the smart card ID (e.g., the EID), the profile ID (e.g., the ICCID), the public key of subscription mgt node 120, the CA-signed public key of subscription mgt node 120, and the deletion code signature, all concatenated together as a single string of data.

LPA 135 at device 100 extracts the smart card ID, the profile ID, the public key, the CA-signed public key, and the deletion code signature from the received deletion code (block 640). Referring to the exemplary deletion code 500 of FIG. 5, upon receipt of the data string represented by deletion code 500, LPA 135 extracts the smart card ID data 510, the profile ID data 520, the subscription mgt node public key data 530, the CA-signed public key data 540, and the deletion code signature data 560 from deletion code 500. FIG. 7B depicts LPA 135 of mobile device 100 extracting 765 the EID, the ICCID, the public key, the CA-signed public key, and the deletion code signature from the deletion code 760 received from subscription mgt node 120.

LPA 135 of device 100 validates the public key of subscription mgt node 120 extracted from the received deletion code (block 643). Validation of the public key of subscription mgt node 120 may include LPA 135 comparing the public key against a Certificate Revocation List (CRL), the contents of which are maintained current by, for example, certificate authority 210 of the PKI system. Whenever CA 210 revokes a particular certificate, the corresponding public key is placed in the CRL for future lookup. In one implementation, LPA 135 sends a message to CA 210, containing the public key of subscription mgt node 120, and CA 210 returns a message, after performing a lookup into the CRL, that indicates whether the public key has been revoked. If the public key of subscription mgt node 120 is found in the CRL, the public key is determined by LPA 135 to not be successfully validated. If the public key is not found in the CRL, then the public key is determined by LPA 135 to be successfully validated.

LPA 135 of device 100 validates the deletion code signature extracted from the received deletion code (block 645). Validation of the deletion code signature may include using a signature verifying algorithm that is the counterpart to the signature generation algorithm used by subscription mgt node 120 to generate the deletion code signature based on subscription mgt node 120's private key. The signature verifying algorithm uses the public key to derive the original block of data that was signed with the signature generation algorithm using the private key of the public/private key pair. LPA 135 uses the subscription mgt node 120's public key, extracted from data 530 of deletion code 500, and applies the signature verifying algorithm to the deletion code signature 560 extracted from deletion code 500. LPA 135 takes the block of data that results from application of the signature verifying algorithm, breaks the block of data into its original smart card ID, profile ID, public key, and CA-signed public key components, and compares each of those components with the appropriate data (e.g., 510, 520, 530, and 540) of the received deletion code 500. If a component-by-component comparison of the data indicates that each component of the block of data matches a corresponding component of the received deletion code 500, then LPA 135 considers the deletion code signature to be validated. FIG. 7B depicts LPA 135 validating 770 the received public key, and then validating 775 the deletion code signature.

LPA 135 of device 100 validates the smart card ID and the profile ID extracted from the received deletion code (block 648). Validation of the smart card ID and the profile ID may include, for example, comparing the smart card ID extracted from the deletion code with the smart card ID stored in smart card memory 140 of device 100 to determine if they match, and comparing the profile ID extracted from the deletion code with the profile ID stored in smart card memory 140 of device 100 to determine if they match. The validation of the smart card ID and the profile ID is considered successful if the smart card ID and the profile ID extracted from the deletion code match those stored in smart card memory 140 of smart card 110. FIG. 7B depicts LPA 135 validating 780 the smart card ID (e.g., the EID) and the profile ID (e.g., the ICCID).

Figure 6A:
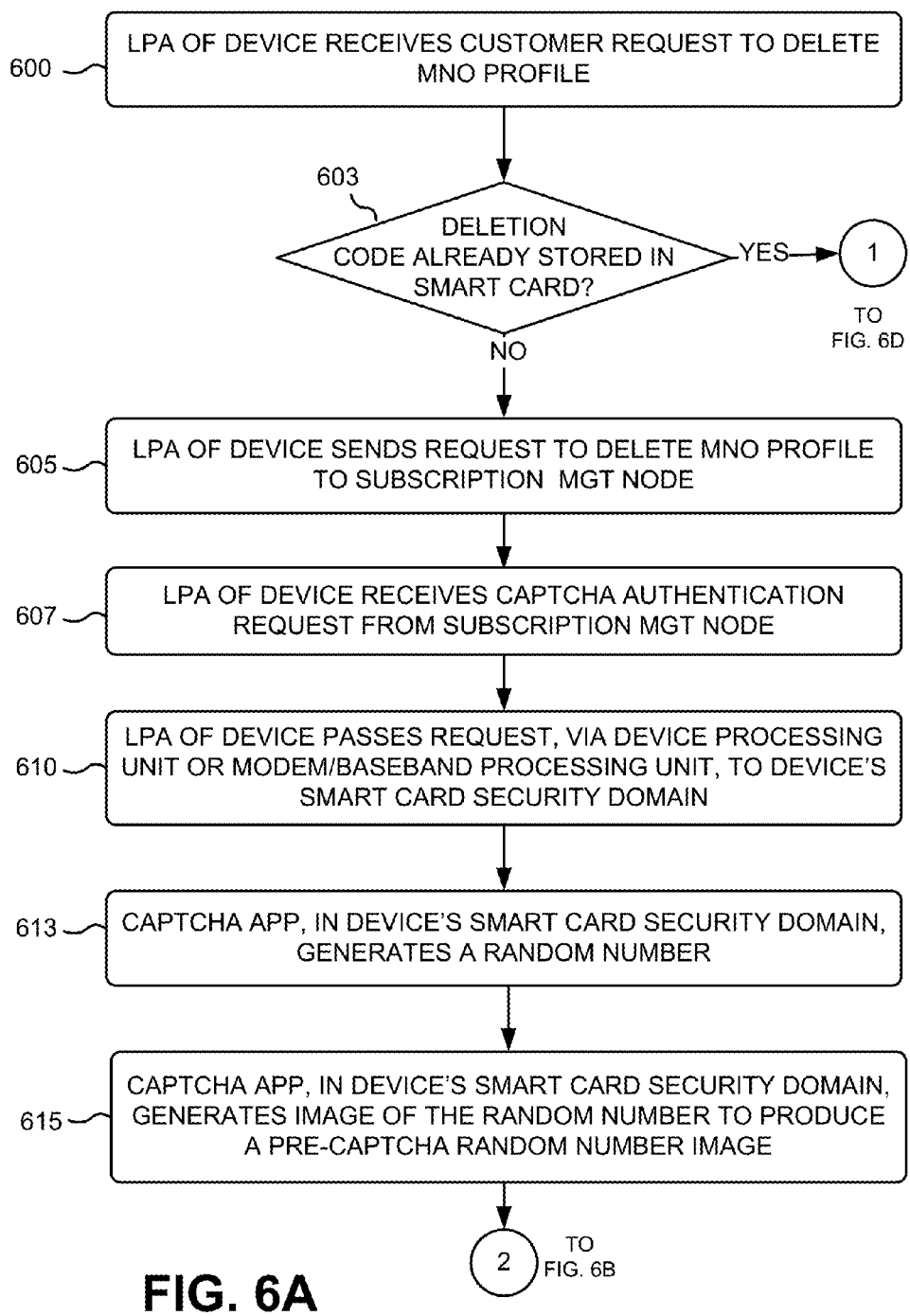
FIGS. 6A-6D are flow diagrams illustrating an exemplary process for obtaining a profile deletion code, to enable a Mobile Network Operator profile to be deleted at a device, based on CAPTCHA authentication of a user/customer of the device.
Figure 6B:
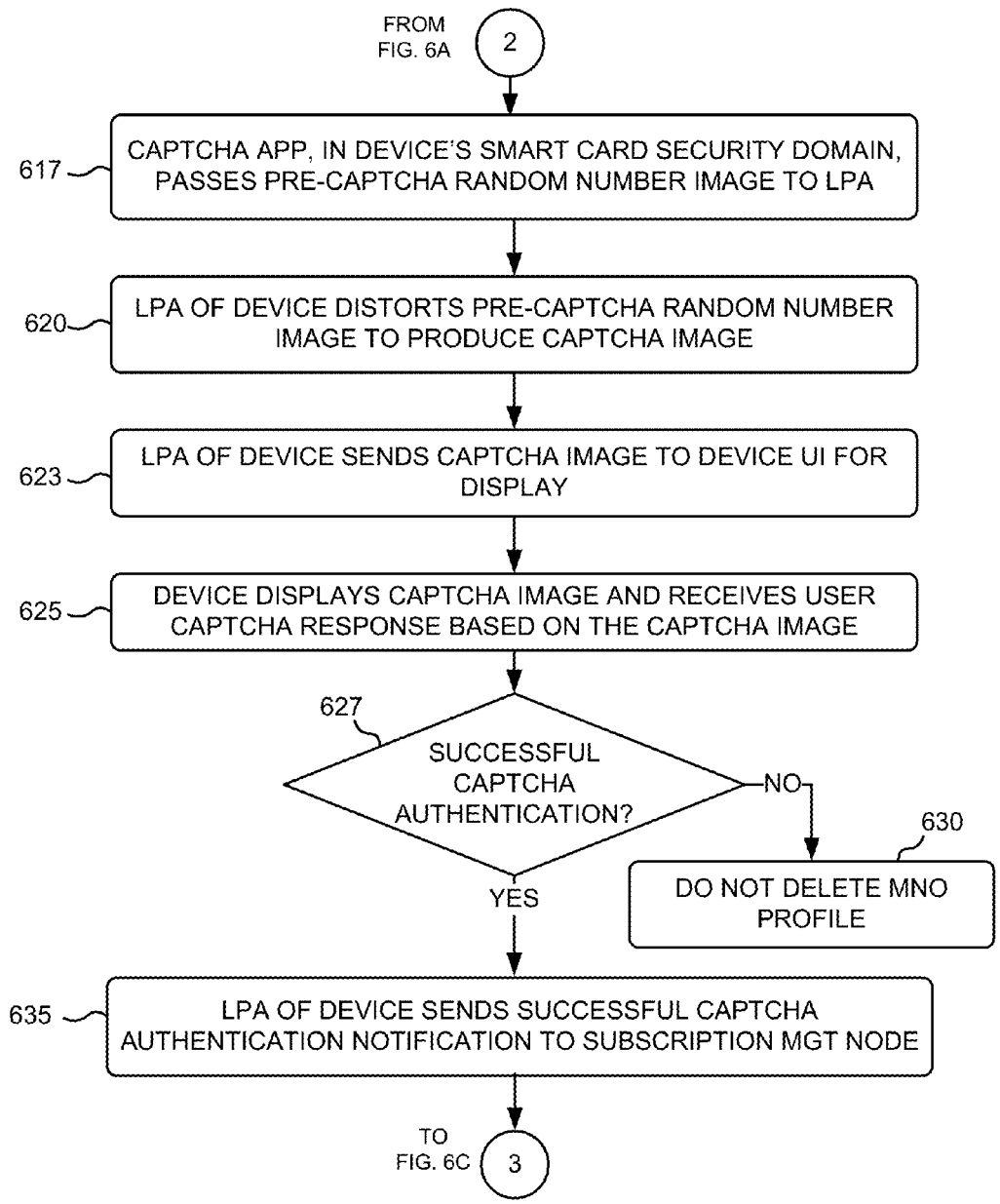
Figure 6C:
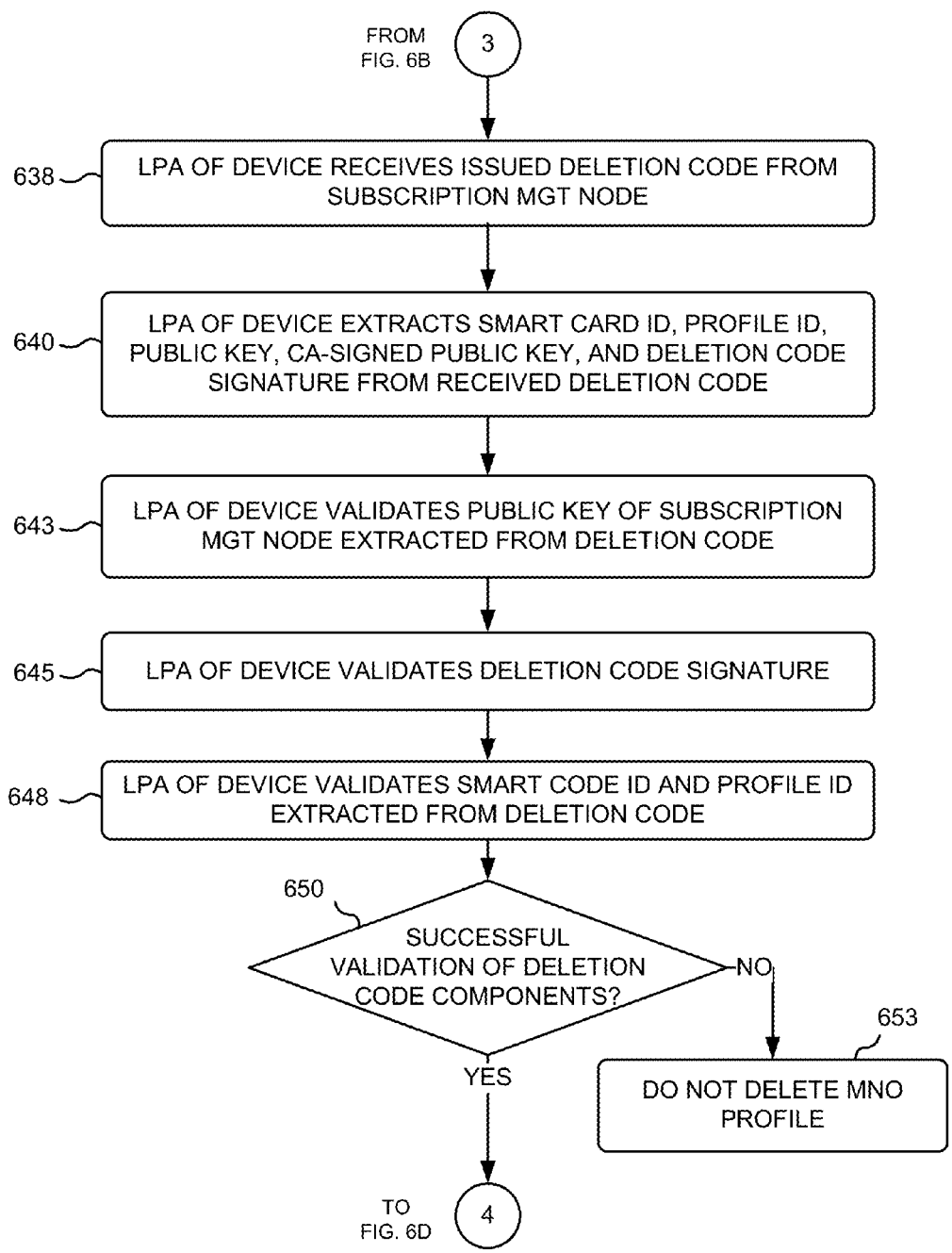
Figure 6D:
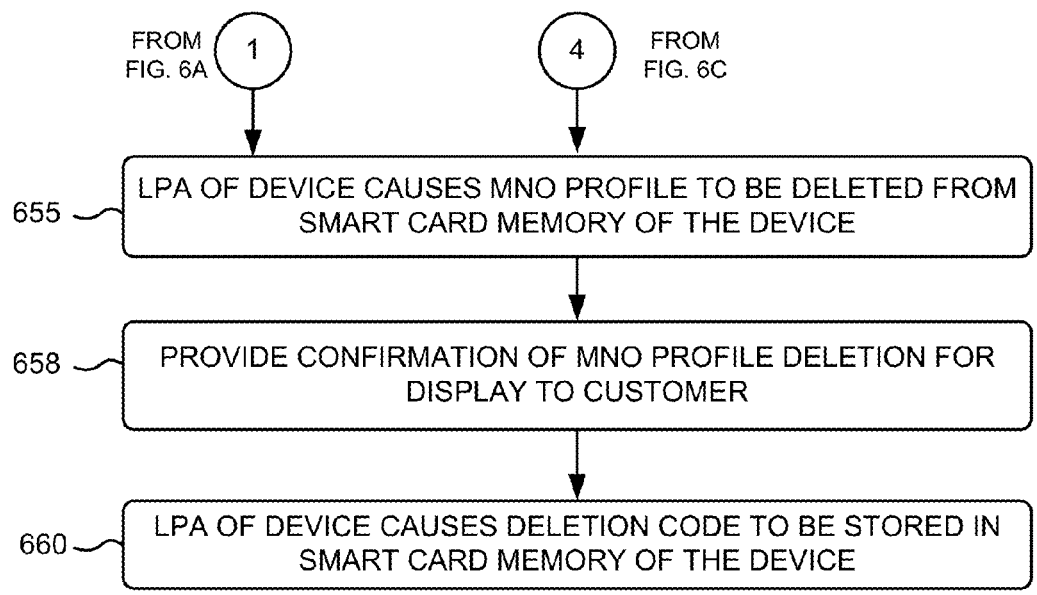

LPA 135 of device 100 determines if the deletion code components have been successfully validated (block 650). If the deletion code components have each been successfully validated in blocks 643, 645, and 648 of FIG. 6C, then the received deletion code is considered to be successfully validated. If the deletion code components (blocks 643, 645 and 648) have not been successfully validated (NO—block 650), then the LPA 135 does not cause the MNO profile to be deleted from memory 140 at device 100 (block 653). If the deletion code components (blocks 643, 645, and 648) have been successfully validated (YES—block 650), then the LPA 135 causes the MNO profile to be deleted from smart card memory 140 (FIG. 6D, block 655). LPA 135 sends an instruction to smart card 110 to delete the MNO profile, and processing unit 410 of smart card 110 deletes the MNO profile from smart card memory 140. FIG. 7B depicts LPA 135 of mobile device 100 causing the MNO profile to be deleted 785 from smart card memory 140 if the validations of blocks 643, 645 and 648 are successful.

LPA 135 provides a confirmation of the MNO profile deletion to user/customer 155 (block 658). The provided confirmation may include, for example, a visual confirmation (e.g., a notification message upon a display of device 100), an audio confirmation (e.g., a notification sound via a speaker of device 100), and/or an audiovisual confirmation (e.g., both the visual notification message accompanied with the notification sound). FIG. 7B depicts LPA 135 providing a confirmation 790 of deletion of the current MNO profile from smart card memory 140 of device 100. LPA 135 may cause the deletion code to be stored in smart card memory 140 (block 660). The deletion code may be stored in smart card memory 140 for future use in smart card memory operations, such as, for example, deleting one or more subsequent, new or updated MNO profiles from smart card memory 140. FIG. 7B depicts LPA 135 causing the deletion code to be stored 795 in smart card memory.

The exemplary process of FIGS. 6A-6D may be repeated for each customer request to delete a MNO profile, received from user/customer 155 at device 100.

Figure 9A:
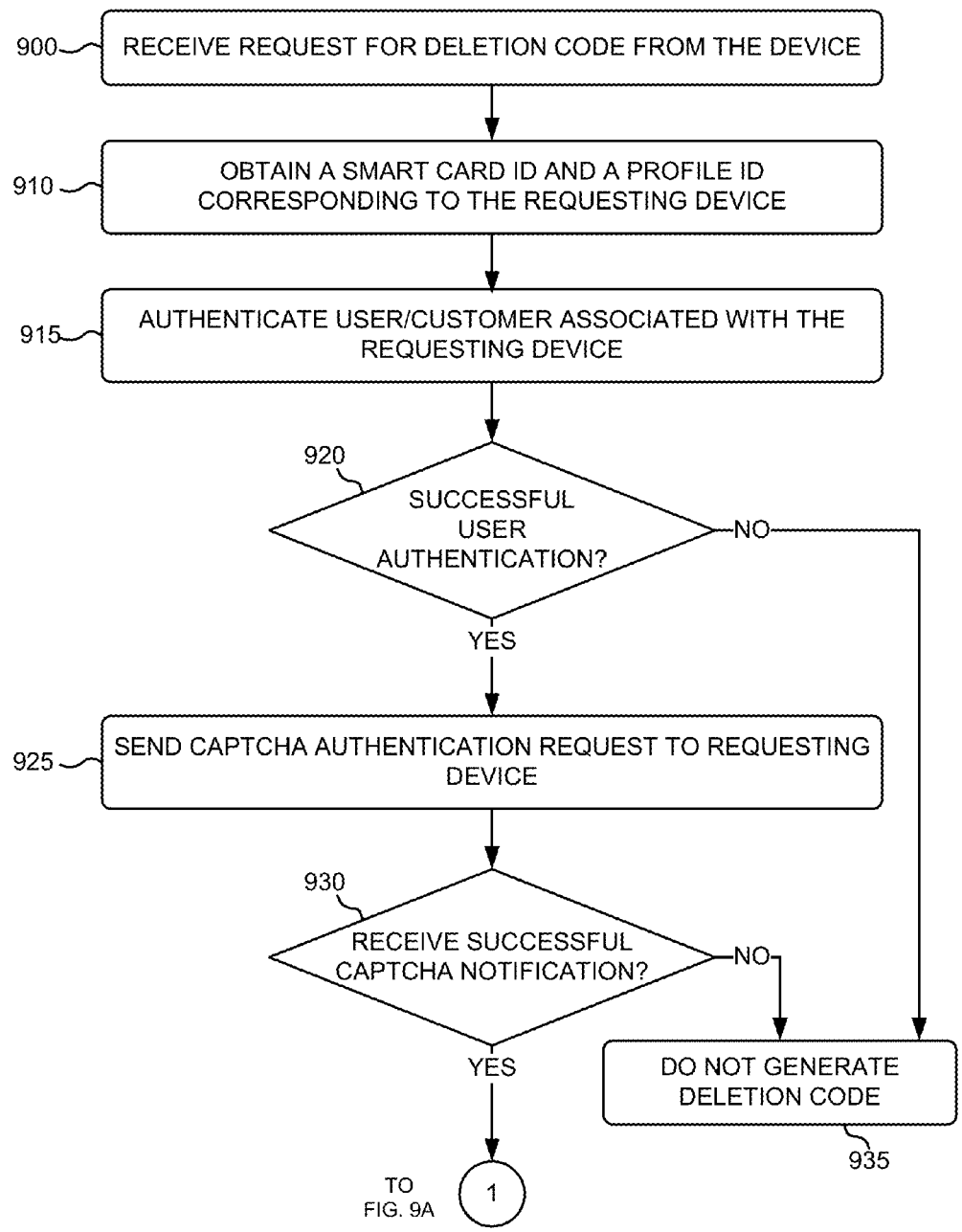
FIGS. 9A and 9B are flow diagrams illustrating an exemplary process for generating and issuing a profile deletion code.
Figure 9B:
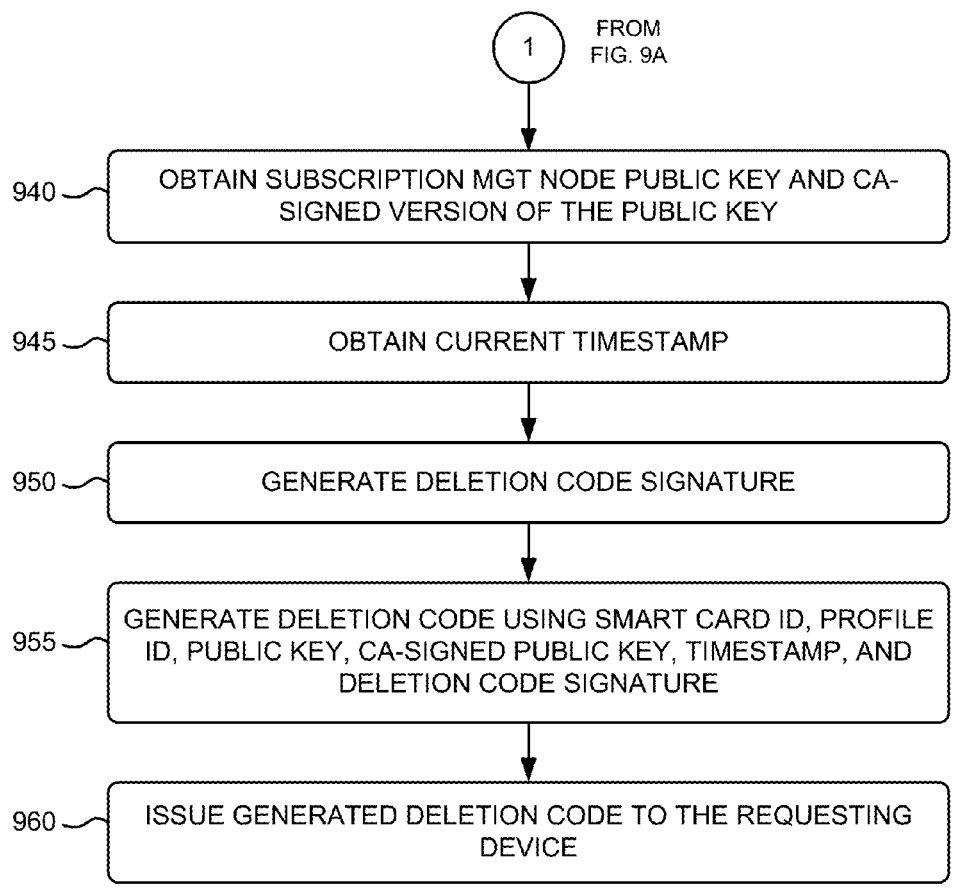

FIGS. 9A and 9B are flow diagrams illustrating an exemplary process for generating and issuing a profile deletion code 500. In one implementation, the exemplary process of FIGS. 9A and 9B may be implemented by subscription mgt node 120. The exemplary process of FIGS. 9A and 9B is described with reference to the exemplary messaging diagrams of FIGS. 7A and 7B.

The exemplary process includes subscription mgt node 120 receiving a request for a deletion code from device 100 (block 900). Referring again to FIG. 7A, subscription mgt node 120 may receive a request 715 for a deletion code from LPA 135 at device 100. Subscription mgt node 120 obtains a smart card ID and a profile ID corresponding to the requesting device 100 (block 910). In one implementation, the received request for the deletion code may contain the smart card ID and the profile ID. In other implementations, subscription mgt node 120 may have previously stored the smart card ID and the profile ID for the particular device 100 from which the request for a deletion code has been received. In further implementations, subscription mgt node 120 may obtain the smart card ID and the profile ID from another node within network(s) 230, such as, for example, a subscriber service storage node in a PLMN of network(s) 230.

Subscription mgt node 120 authenticates the user/customer 155 associated with the requesting device 100 (block 915). Various different existing techniques may be used to authenticate the customer/user 155 of device 100. Authentication of the customer/user 155 may include, for example, verifying the smart card ID and the profile ID corresponding to the requesting device 100. Subscription mgt node 120 determines if the user authentication has been successful (block 920). If the user authentication is not successful (NO—block 920), then subscription mgt node 120 does not generate a deletion code (block 935), and the exemplary process of FIGS. 9A and 9B ends. If the user authentication is successful (YES—block 920), then subscription mgt node 120 sends a CAPTCHA authentication request to the requesting device 100 (block 925).

Subscription mgt node 120 determines if, subsequent to sending the CAPTCHA authentication request, a successful CAPTCHA notification is received from device 100 (block 930). If a successful CAPTCHA notification is not received from device 100 (NO—block 930), then subscription mgt node 120 does not generate a deletion code (block 935), and the exemplary of process of FIGS. 9A and 9B ends at block 935. If a successful CAPTCHA notification is received from device 100 (YES—block 930), then subscription mgt node 120 obtains its public key and a certificate authority-signed version of the public key (FIG. 9B, block 940). Subscription mgt node 120 may have previously obtained an asymmetric encryption key pair, including a public key and a corresponding private key, from another node in network(s) 230. Alternatively, subscription mgt node 120 may implement, itself, an encryption key generation algorithm that generates the public and private key pair. Subscription mgt node 120 may also engage in PKI processes to provide the public key to the PKI system, and to obtain a digital certificate that maps the public key to the particular customer/user of device 100. The Certificate Authority of the PKI system, upon successful registration and authentication of the identity of the customer/user, digitally signs the public key (e.g., using the CA's own private key) and returns to the CA-signed public key to subscription mgt node 120.

Subscription mgt node 120 obtains a current timestamp (block 945). Subscription mgt node 120 may maintain an accurate clock that keeps track of the current date and/or time. The time may, for example, include a Universal Time, Coordinated (UTC) time that subscription mgt node 120 may synchronize with an external time standard. Subscription mgt node 120 generates a deletion code signature (block 950). Subscription mgt node 120 may concatenate the smart card ID, the profile ID, the subscription mgt node 120's public key, and the CA-signed public key together to create a string of data. Subscription mgt node 120 may then generate a deletion code signature, using a signature generation algorithm and the private key of subscription mgt node 120, applying the signature generation algorithm to the string of data including the smart card ID, the profile ID, the subscription mgt node 120's public key, and the CA-signed public key. Subscription mgt node 120 may use various different existing signature generating algorithms to generate the signature. Such signature generating algorithms may include, for example, RSA-based signature schemes, the Digital Signature Algorithm (DSA), the Pointcheval-Stern Signature algorithm, or the Rabin Signature algorithm.

Subscription mgt node 120 generates a deletion code using the smart card ID, the profile ID, the public key, the CA-signed public key, the timestamp, and the deletion code signature (block 955). Subscription mgt node 120 may optionally concatenate the timestamp (i.e., obtained in block 945) to the string of data that includes data 510, 520, 530 and 540 of FIG. 5. Subscription mgt node 120 appends the generated deletion code signature (of block 955) to the concatenated data to produce the profile deletion code. Referring to FIG. 5, the deletion code 500 may include data that further includes the smart card ID 510, the profile ID 520, the subscription mgt node public key 530, the CA-signed public key 540, an optional timestamp 550, and the deletion code signature 560. Subscription mgt node 120 issues the generated deletion code to the requesting device 100 (block 960). Referring to FIG. 7B, subscription mgt node 120 returns the requested deletion code 760 to LPA 135 at device 100. The generated deletion code 500 of block 960 does not contain any secret values, so it does not need to be protected for confidentiality. The generated deletion code 500 is also unique for each subscription mgt node 120, and is directed to a specific smart card ID and profile ID such that the deletion code 500 cannot be replayed to another smart card (e.g., another eUICC). The timestamp 560 may also be used to ensure that deletion code 500 cannot improperly be used at a future time to conduct a replay attack.

The exemplary process of FIGS. 9A and 9B may be repeated for each request for a deletion code received at subscription mgt node 120 from a device 100.

FIGS. 10A-10D are flow diagrams illustrating an exemplary process for obtaining a profile deletion code, to enable a MNO profile to be deleted at a companion device $100^C$, based on CAPTHCA authentication of user/customer 155. The exemplary process of FIGS. 10A-10D involves an exemplary implementation in which customer/user 155 has both a primary device $100^P$, and a companion device $100^C$ connected to primary device $100^P$ via a wired or wireless connection, and companion device $100^C$ does not have any type of display device for displaying a CAPTCHA image to customer/user 155. The exemplary process of FIGS. 10A-10D may be implemented by processing unit 125 of companion device $100^C$, in conjunction with processing unit 125 of primary device $100^P$, and/or processing unit 410 of smart card 110. The exemplary process of FIGS. 10A-10D is described with reference to the exemplary messaging diagram of FIGS. 11A and 11B.

Figure 11A:
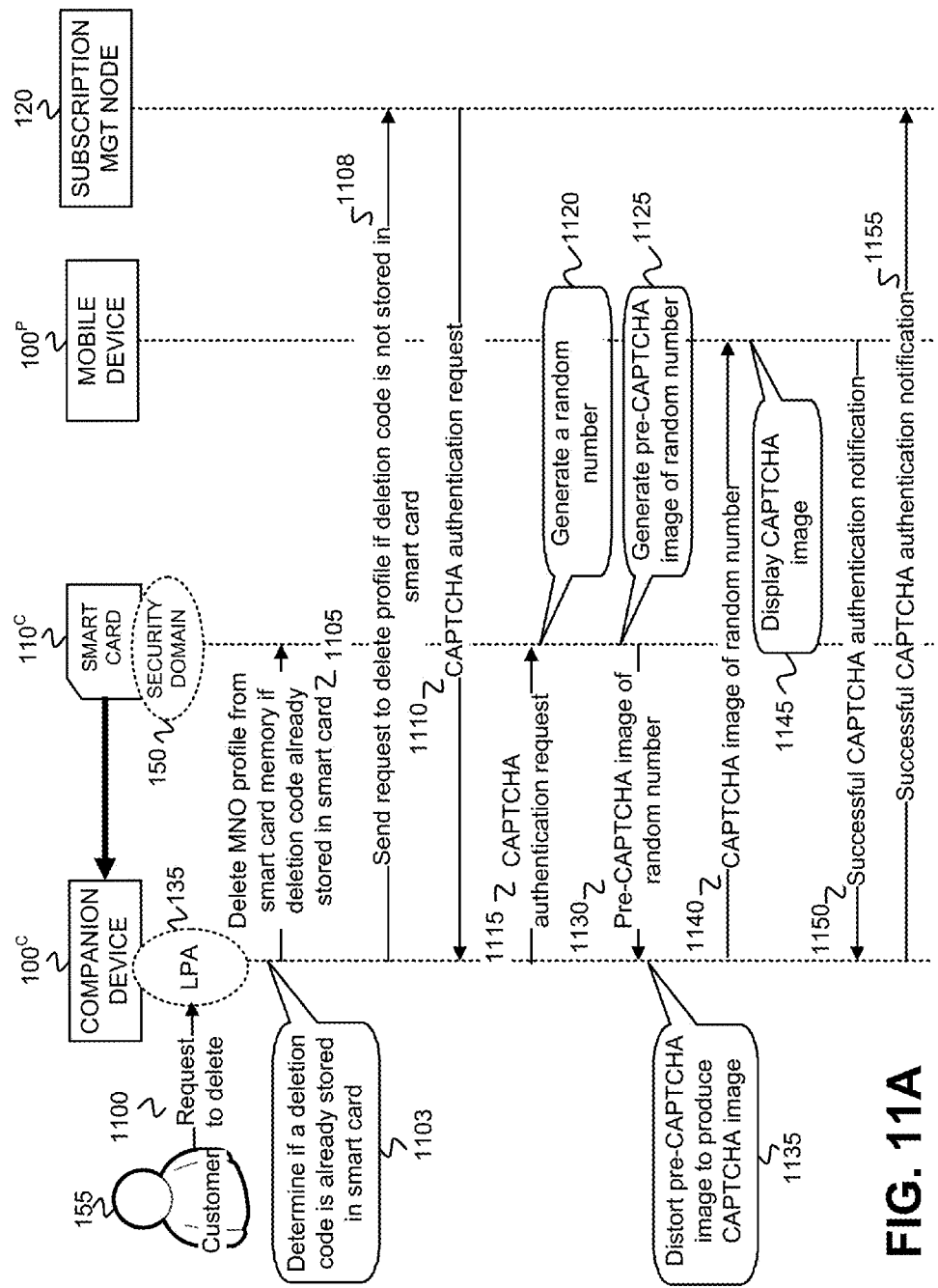
FIGS. 11A and 11B are messaging diagrams associated with the exemplary process of FIGS. 10A-10D.

The exemplary process includes LPA 135 of companion device $100^C$ receiving a customer request to delete the customer's MNO profile from storage at device 100 (block 1000). The customer/user 155 may wish to download a new or updated MNO profile and may provide input into companion device $100^C$ requesting deletion of the current MNO profile. The customer/user 155 may, for example, apply user input via input device(s) 350 of companion device $100^C$ that requests, either explicitly or implicitly, deletion of the current MNO profile. As an example, if the customer/user 155 of companion device $100^C$ requests the download of a new MNO profile, then the current MNO profile must first be deleted so that the request to download the new MNO profile is taken as an implicit request by the customer/user to delete the current MNO profile. FIG. 11A depicts customer 155 providing a request 1100 to delete the current MNO profile to companion device $100^C$.

LPA 135 at companion device $100^C$ determines if a deletion code is already stored in smart card $110^C$ (block 1005). Upon receipt of the request to delete the current MNO profile, LPA 135 sends an inquiry to smart card $110^C$ requesting smart card $110^C$ to determine whether there already is a deletion code stored in smart card memory 140 of smart card $110^C$. For example, a deletion code may have been delivered to smart card $110^C$ by the manufacturer and stored in smart card memory 140. As another example, the customer/user 155 of companion device $100^C$ may have used a camera of companion device $100^C$ to scan a Quick Response (QR) code that encodes a deletion code, and the decoded deletion code may have been stored in smart card memory 140. As a further example, companion device $100^C$ may have been placed in proximity to a deletion code delivery device that transmits, via Near Field Communication (NFC) protocols, a deletion code to companion device $100^C$ where it is then stored in smart card memory 140. FIG. 11A depicts LPA 135 of companion device $100^C$ determining 1103 if a deletion code is already stored in the smart card $110^C$ of companion device $100^C$.

Smart card $110^C$, subsequent to a memory lookup in smart card memory 140, replies with an indication that the deletion code is, or is not, already stored in memory 140. If the deletion code is already stored in memory 140 of smart card $110^C$ (YES—block 1003), then the exemplary process continues at block 1055 (FIG. 10D) below with the deletion of the MNO profile from smart card memory 140. FIG. 11A depicts LPA 135 deleting 1105 the current MNO profile from smart card memory 140 if a deletion code is already stored in smart card $110^C$. If a deletion code is not already stored in smart card $110^C$ (NO—block 1003), then LPA 135 at companion device $100^C$ sends a request for a deletion code to subscription mgt node 120 (block 1005). In one implementation, the request for the deletion code may include the smart card ID of the smart card 110 of the companion device $100^C$, and/or the profile ID of the current MNO profile. FIG. 11A depicts LPA 135 at companion device $100^C$ sending 1108 a request for a deletion code to subscription mgt node 120 if a deletion code is not already stored in smart card memory 140 of smart card $110^C$. Upon receipt of the request for the deletion code, subscription mgt node 120 authenticates the customer/user 155, and responds with a CAPTCHA authentication request, as described with respect to the exemplary process of FIGS. 9A and 9B above.

LPA 135 of companion device $100^C$, in response to the request for a deletion code, receives a CAPTCHA authentication request from subscription mgt node 120 (block 1007), and passes the CAPTCHA authentication request, via device processing unit 125 or modem/baseband processing unit 130, to companion device $100^C$'s smart card security domain 150 (block 1010). FIG. 11A depicts companion device $100^C$ receiving a CAPTCHA authentication request 1110 from subscription management node 120, and LPA 135 passing the CAPTCHA authentication request 1115 to security domain 150 of smart card $100^C$.

CAPTCHA app 160, executing within the companion device's smart card security domain 150, generates a random number (block 1013), and generates an image of the random number to produce a pre-CAPTCHA random number image (block 1015). Various different types of random number generating algorithms may be used by CAPTCHA app 160 to generate the random number. CAPTCHA app 160 may generate various different types of images (e.g., bmp, jpg, gif, etc.) for depicting the generated random number. FIG. 11A depicts the generation 1120 of the random number, and the generation 1125 of a pre-CAPTCHA image of the random number, within security domain 150 of smart card $110^C$. CAPTCHA app 160 passes the pre-CAPTCHA random number image to LPA 135 (block 1017), and LPA 135 of companion device $100^C$ distorts the received pre-CAPTCHA random number image to produce a CAPTCHA image (block 1020). LPA 135 of companion device $100^C$ sends the distorted CAPTCHA image to primary device $100^P$'s user interface (UI) for display to customer/user 155 (block 1023). Primary device $100^P$ displays the distorted CAPTCHA image and receives a user CAPTCHA response based on the displayed CAPTCHA image (block 1025). FIG. 11A depicts smart card 110 passing 1130 the pre-CAPTCHA image of the random number to LPA 135 of companion device $100^C$, LPA 135 at companion device $100^C$ distorting 1135 the pre-CAPTCHA image to produce a CAPTCHA image, sending 1140 the CAPTCHA image of the random number to primary device $100^P$, and primary device $100^P$ displaying 1145 the distorted CAPTCHA image of the random number at primary device $100^P$ to customer/user 155. User/customer 155 may, upon viewing the distorted CAPTCHA image of the random number, enter, via a user interface of primary device $100^P$, the random number. FIG. 8 depicts an example of the distorted CAPTCHA image of the random number being displayed to user/customer 155 via a display 810 of primary device $100^P$. As shown in FIG. 8, a CAPTCHA response window 820 may be displayed in display 810 of primary device $100^P$, wherein CAPTCHA response window 820 presents the CAPTCHA image 830 that includes the distorted image of the random number, and a CAPTCHA response box 840 that permits user/customer 155 to supply the random number presented via CAPTCHA image 830.

LPA 135 of primary device $100^P$, based on the received user CAPTCHA response, determines if the user/customer 155 has been successfully CAPTCHA authenticated (block 1027). Referring again to the example of FIG. 8, if user/customer 155 enters the correct number in CAPTCHA response box 840 that corresponds exactly to the random number depicted via distorted CAPTCHA image 830, then user/customer 155 is considered to be successfully CAPTCHA authenticated (i.e., the user is not a bot, or other automated entity). If LPA 135 at primary device $100^P$ determines that user/customer 155 has failed to successfully CAPTCHA authenticate (NO—block 1027), then LPA 135 does not cause the MNO profile to be deleted from smart card memory 140 (block 1030). If LPA 135 of primary device $100^P$ determines that user/customer 155 has successfully CAPTCHA authenticated (YES—block 1027), then LPA 135 of primary device $100^P$ sends a successful CAPTCHA authentication notification to companion device $100^C$ (block 1033), and LPA 135 of companion device $100^C$ then sends a successful CAPTCHA authentication notification to subscription mgt node 120 (block 1035). As shown in FIG. 11A, LPA 135 at companion device $100^C$ learns of a successful CAPTCHA authentication at primary device $100^P$ by primary device $100^P$ sending a successful CAPTCHA authentication notification 1150 to companion device $100^C$, and LPA 135, based on receipt of notification 1150 from primary device $100^P$, sends a successful CAPTCHA authentication notification 1155 to subscription mgt node 120.

LPA 135 at companion device $100^C$, in response to sending the successful CAPTCHA authentication notification, receives a deletion code issued from subscription mgt node 120 (block 1038). The deletion code generated by subscription mgt node 120 may include multiple components as described above with respect to the deletion code 500 of FIG. 5. In the example depicted in FIG. 11B, the deletion code 1160 generated by subscription mgt node 120 may include the smart card ID (e.g., the EID), the profile ID (e.g., the ICCID), the public key of subscription mgt node 120, the CA-signed public key of subscription mgt node 120, and the deletion code signature, all concatenated together as a single string of data.

Figure 11B:
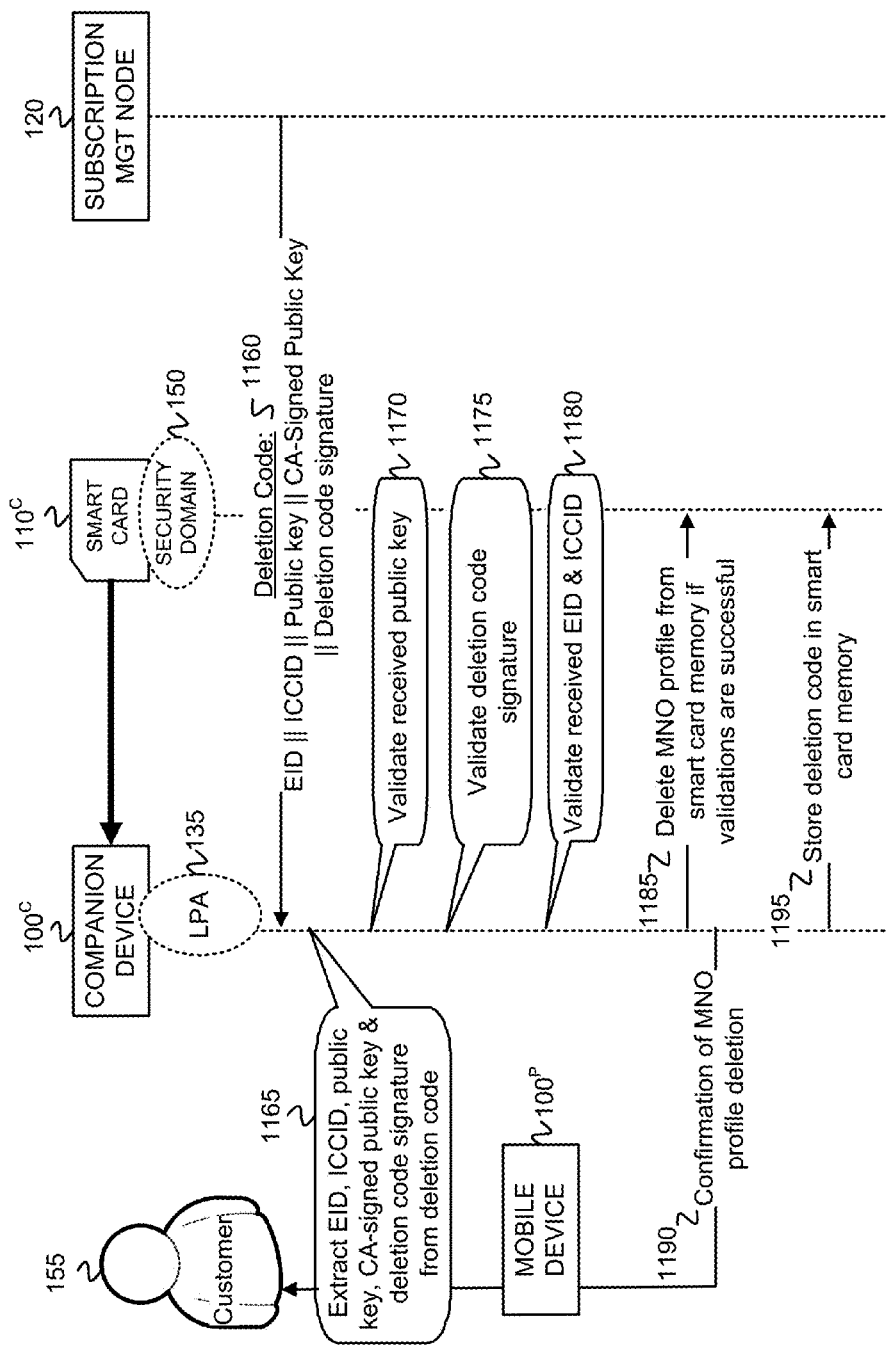

LPA 135 at companion device $100^C$ extracts the smart card ID, the profile ID, the public key, the CA-signed public key, and the deletion code signature from the received deletion code (block 1040). Referring to the exemplary deletion code 500 of FIG. 5, upon receipt of the data string represented by deletion code 500, LPA 135 extracts the smart card ID data 510, the profile ID data 520, the subscription mgt node public key data 530, the CA-signed public key data 540, and the deletion code signature data 560 from deletion code 500. FIG. 11B depicts LPA 135 of companion device $100^C$ extracting 1165 the EID, the ICCID, the public key, the CA-signed public key, and the deletion code signature from the deletion code 1160 received from subscription mgt node 120.

LPA 135 of companion device $100^C$ validates the public key of subscription mgt node 120 extracted from the received deletion code (block 1043). Validation of the public key of subscription mgt node 120 may include LPA 135 comparing the public key against a Certificate Revocation List (CRL), the contents of which are maintained current by, for example, certificate authority 210 of the PKI system. Whenever CA 210 revokes a particular certificate, the corresponding public key is placed in the CRL for future lookup. In one implementation, LPA 135 sends a message to CA 210, containing the public key of subscription mgt node 120, and CA 210 returns a message, after performing a lookup into the CRL, that indicates whether the public key has been revoked. If the public key of subscription mgt node 120 is found in the CRL, the public key is determined by LPA 135 to not be successfully validated. If the public key is not found in the CRL, then the public key is determined by LPA 135 to be successfully validated.

LPA 135 of companion device $100^C$ validates the deletion code signature extracted from the received deletion code (block 1045). Validation of the deletion code signature may include using a signature verifying algorithm that is the counterpart to the signature generation algorithm used by subscription mgt node 120 to generate the deletion code signature based on subscription mgt node 120's private key. The signature verifying algorithm uses the public key to derive the original block of data that was signed with the signature generation algorithm using the private key of the public/private key pair. LPA 135 uses the subscription mgt node 120's public key, extracted from data 530 of deletion code 500, and applies the signature verifying algorithm to the deletion code signature 560 extracted from deletion code 500. LPA 135 takes the block of data that results from application of the signature verifying algorithm, breaks the block of data into its original smart card ID, profile ID, public key, and CA-signed public key components, and compares each of those components with the appropriate data (e.g., 510, 520, 530, and 540) of the received deletion code 500. If a component-by-component comparison of the data indicates that each component of the block of data matches a corresponding component of the received deletion code 500, then LPA 135 considers the deletion code signature to be validated. FIG. 11B depicts LPA 135 validating 1170 the received public key, and then validating 1175 the deletion code signature.

LPA 135 of companion device $100^C$ validates the smart card ID and the profile ID extracted from the received deletion code (block 1048). Validation of the smart card ID and the profile ID may include, for example, comparing the smart card ID extracted from the deletion code with the smart card ID stored in smart card memory 140 of companion device $100^C$ to determine if they match, and comparing the profile ID extracted from the deletion code with the profile ID stored in smart card memory 140 of companion device $100^C$ to determine if they match. The validation of the smart card ID and the profile ID is considered successful if the smart card ID and the profile ID extracted from the deletion code match those stored in smart card memory 140 of smart card 110$^C$. FIG. 11B depicts LPA 135 validating 1180 the smart card ID (e.g., the EID) and the profile ID (e.g., the ICCID).

Figure 10A:
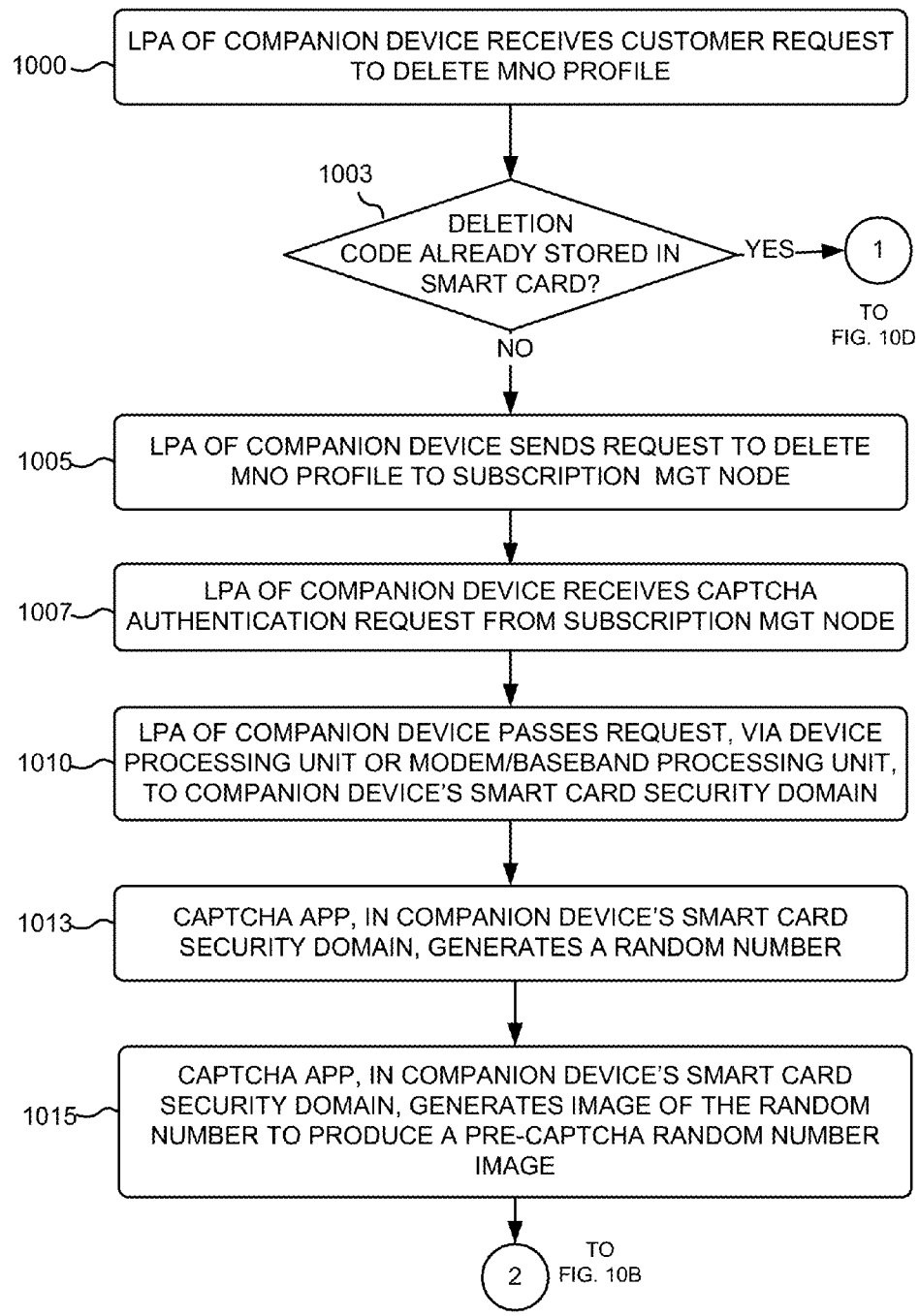
FIGS. 10A-10D are flow diagrams illustrating an exemplary process for obtaining a profile deletion code, to enable a Mobile Network Operator profile to be deleted at a companion device, based on CAPTHCA authentication of a user/customer, where the companion device is connected to a primary device via a wired or wireless connection and the companion device does not have a display device for displaying a CAPTCHA image to the customer/user.
Figure 10B:
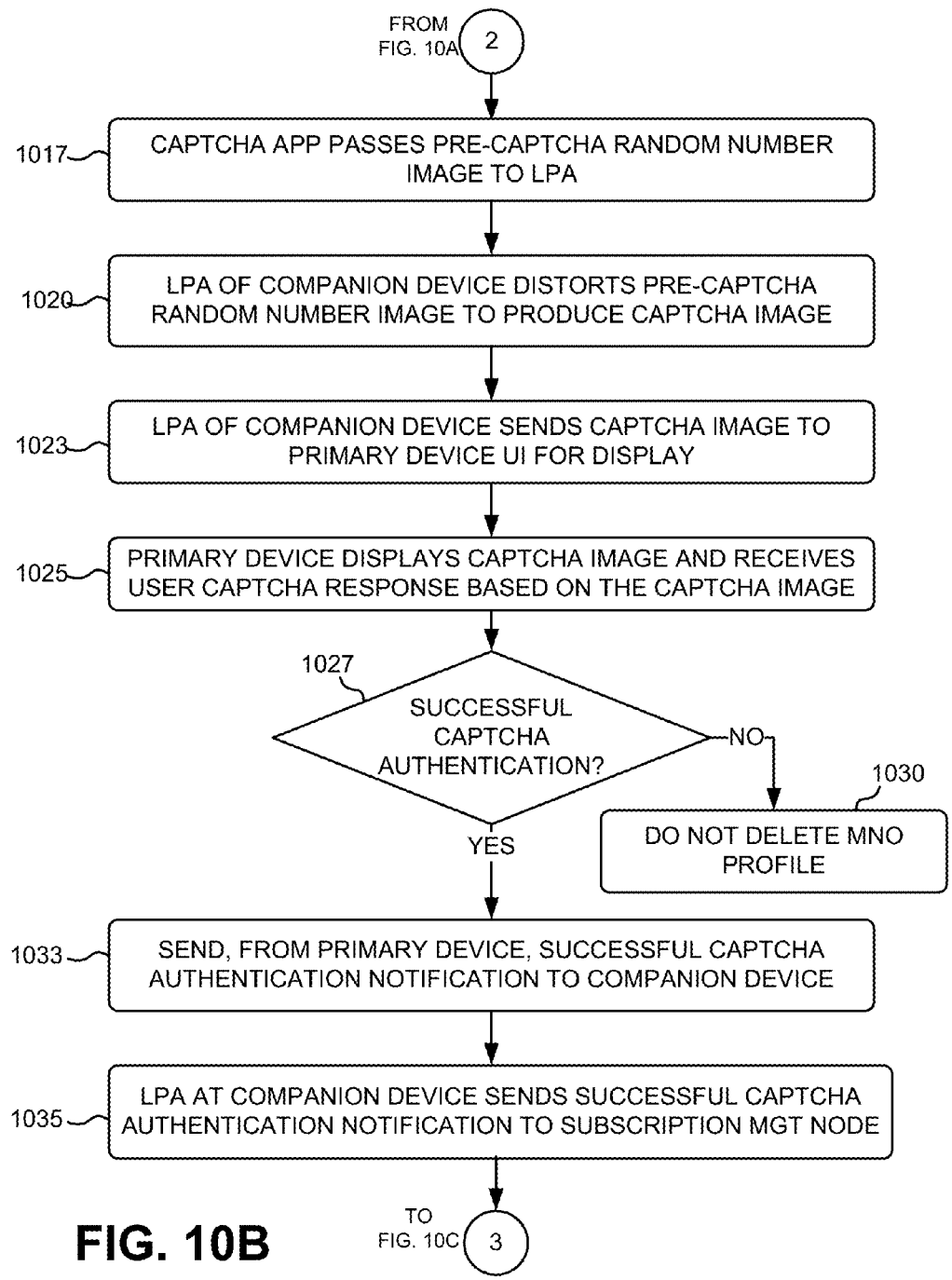
Figure 10C:
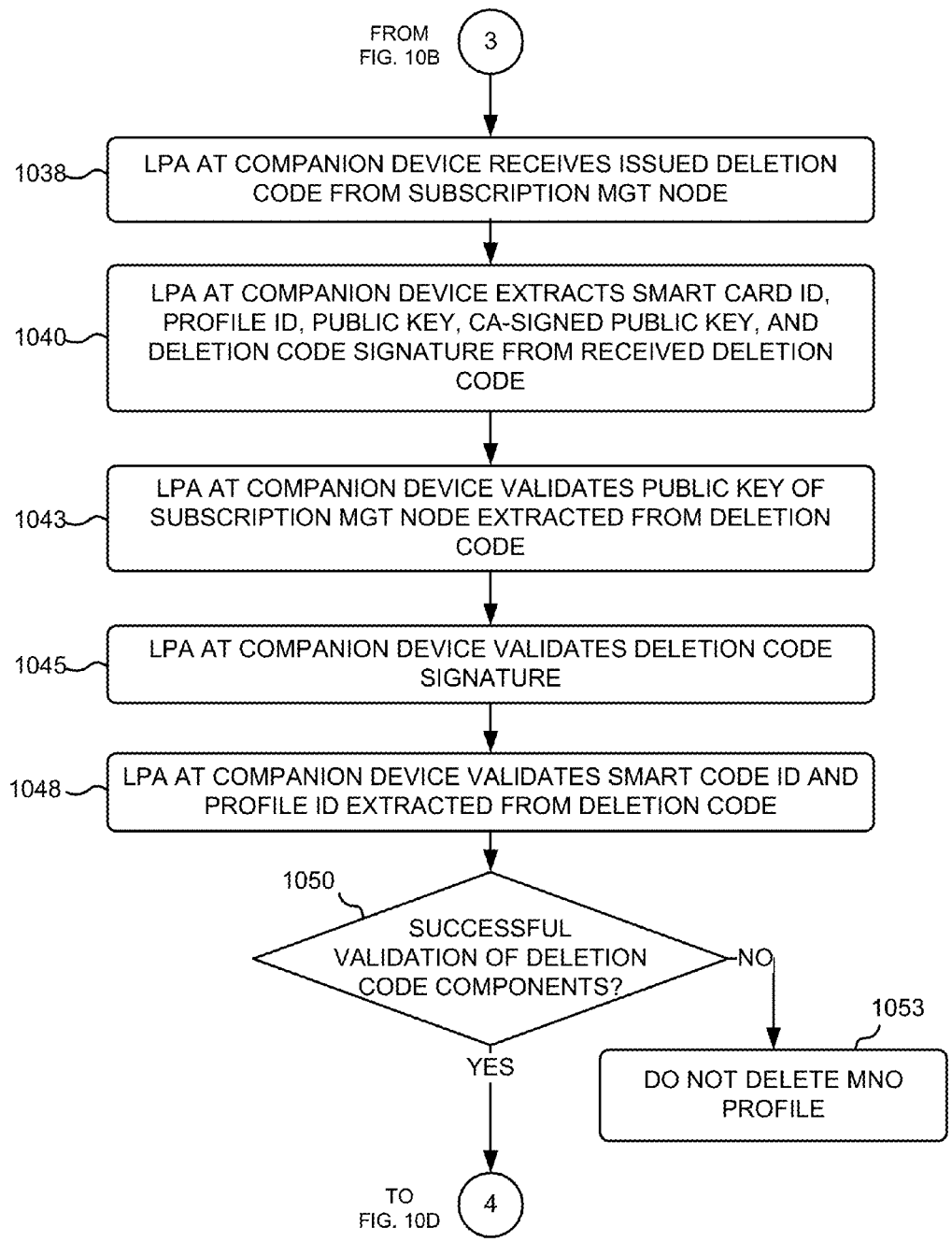
Figure 10D:
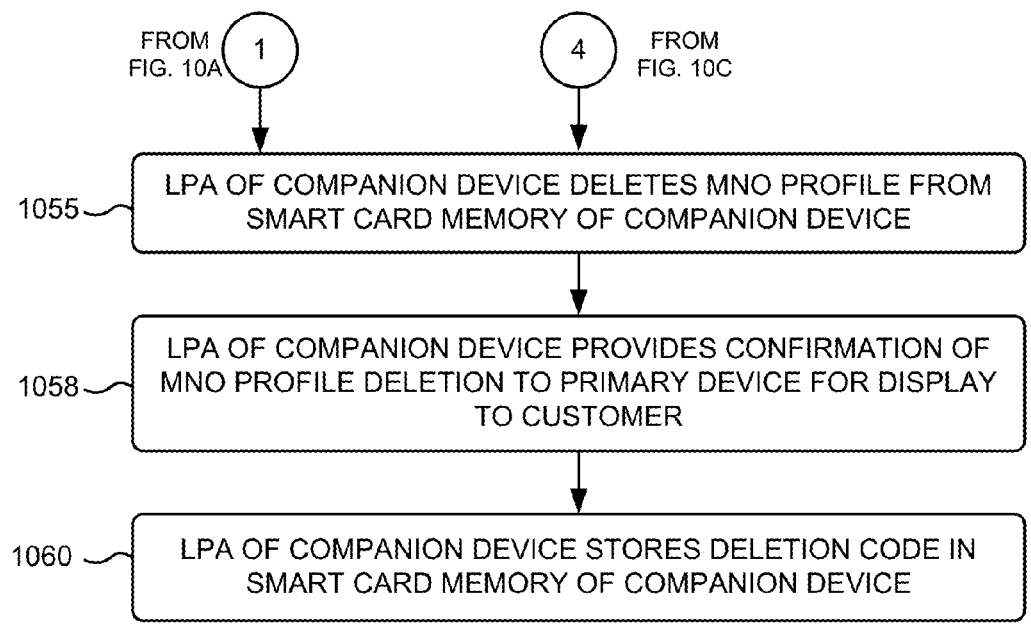

LPA 135 of companion device 100C determines if the deletion code components have been successfully validated (block 1050). If the deletion code components have each been successfully validated in blocks 1043, 1045, and 1048 of FIG. 10C, then the received deletion code is considered to be successfully validated. If the deletion code components (blocks 1043, 1045 and 1048) have not been successfully validated (NO—block 1050), then the LPA 135 does not cause the MNO profile to be deleted from memory 140 at companion device 100C (block 1053). If the deletion code components (blocks 1043, 1045, and 1048) have been successfully validated (YES—block 1050), then the LPA 135 causes the MNO profile to be deleted from smart card memory 140 of smart card 110C of companion device 100C (FIG. 10D, block 1055). LPA 135 sends an instruction to smart card 110C to delete the MNO profile, and processing unit 410 of smart card 110C deletes the MNO profile from smart card memory 140. FIG. 11B depicts LPA 135 of companion 100C causing the MNO profile to be deleted 1185 from smart card memory 140 if the validations of blocks 1043, 1045 and 1048 are successful.

LPA 135 provides a confirmation of the MNO profile deletion to user/customer 155 (block 1058). The provided confirmation may include, for example, a visual confirmation (e.g., a notification message upon a display of primary device 100$^P$), an audio confirmation (e.g., a notification sound via a speaker of companion device 100$^C$ or primary device 100$^P$), and/or an audiovisual confirmation (e.g., both the visual notification message accompanied with the notification sound). FIG. 11B depicts LPA 135 providing a confirmation 1190, via a display of primary device 100$^P$, of deletion of the current MNO profile from smart card memory 140 of device 100$^C$. LPA 135 may cause the deletion code to be stored in smart card memory 140 of smart card 110$^C$ (block 1060). The deletion code may be stored in smart card memory 140 of smart card 110$^C$ for future use in smart card memory operations, such as, for example, deleting one or more subsequent, new or updated MNO profiles from smart card memory 140. FIG. 11B depicts LPA 135 causing the deletion code to be stored 1195 in smart card memory.

The exemplary process of FIGS. 10A-10D may be repeated for each customer request to delete a MNO profile, received from user/customer 155 at companion device 100$^C$.

FIGS. 12A-12D are flow diagrams illustrating an exemplary process for obtaining a profile deletion code, to enable a MNO profile to be deleted via use of a companion device 100$^C$, based on CAPTHCA authentication of user/customer 155. The exemplary process of FIGS. 12A-12D involves an exemplary implementation in which customer/user 155 has both a primary device 100$^P$, and a companion device 100$^C$ connected to primary device 100$^P$ via a wired or wireless connection, and companion device 100$^C$ does not include a smart card 110$^C$ (e.g., no connection to a PLMN of network(s) 230 via companion device 100$^C$) and the MNO profile is stored in smart card 110$^P$ of primary device 100$^P$. The exemplary process of FIGS. 12A-12D may be implemented by processing unit 125 of companion device 100$^C$, in conjunction with processing unit 125 of primary device 100$^P$, and/or processing unit 410 of smart card 110. The exemplary process of FIGS. 12A-12D is described with reference to the exemplary messaging diagram of FIGS. 13A and 13B.

Figure 13A:
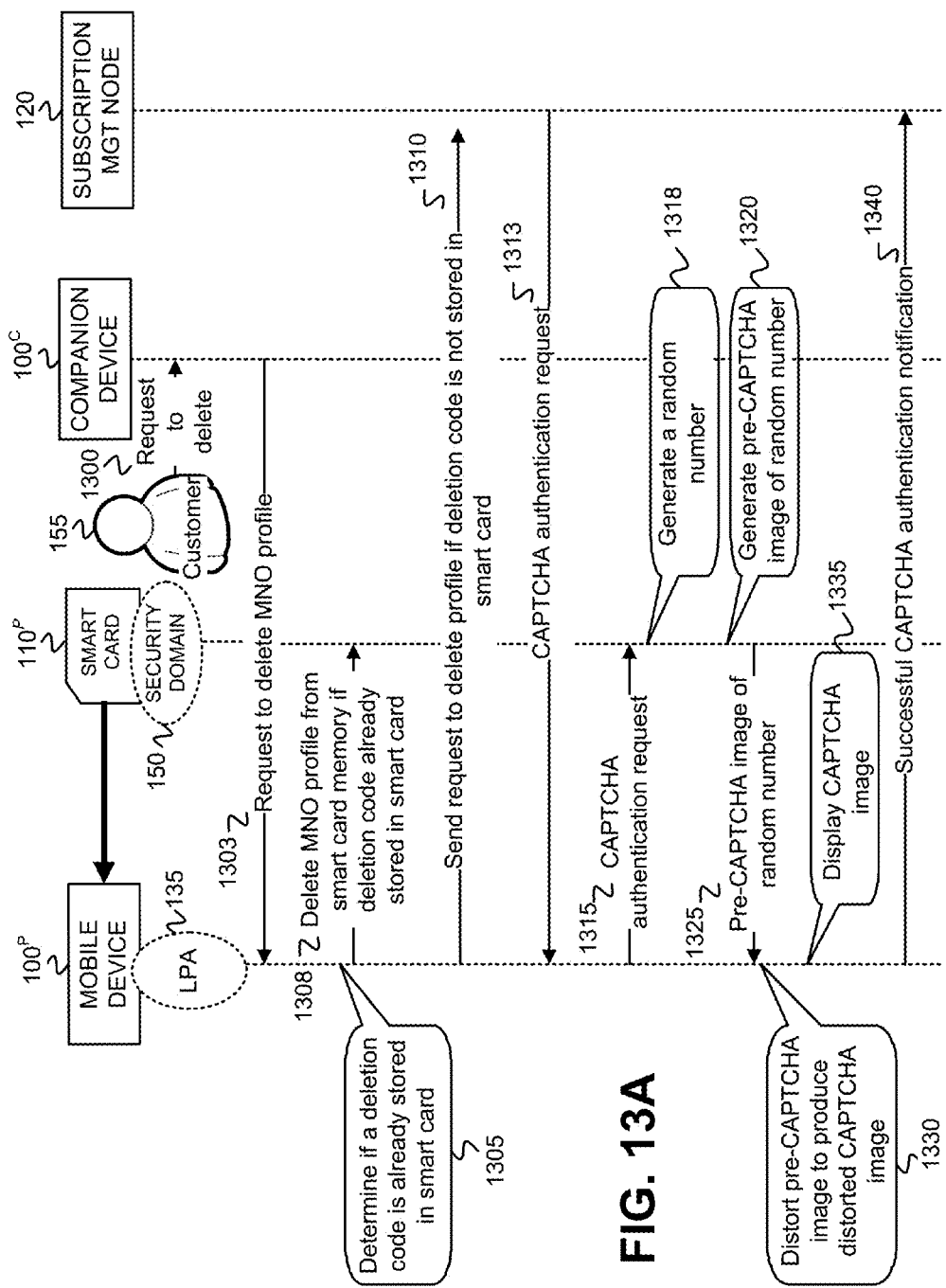
FIGS. 13A and 13B are messaging diagrams associated with the exemplary process of FIGS. 12A-12D.

The exemplary process includes LPA 135 of companion device 100$^C$ receiving a customer request to delete the customer's MNO profile from storage at primary device 100$^P$ (block 1200). The customer/user 155 may wish to download a new or updated MNO profile and may provide input into companion device 100$^C$ requesting deletion of the current MNO profile. The customer/user 155 may, for example, apply user input via input device(s) 350 of companion device 100$^C$ that requests, either explicitly or implicitly, deletion of the current MNO profile. As an example, if the customer/user 155 of companion device 100$^C$ requests the download of a new MNO profile, then the current MNO profile must first be deleted so that the request to download the new MNO profile is taken as an implicit request by the customer/user to delete the current MNO profile. Companion device 100$^C$ passes the request to delete the MNO profile to LPA 135 of primary device 100$^P$ (block 1203). FIG. 13A depicts customer 155 providing a request 1300 to delete the current MNO profile to companion device 100$^C$, and companion device 100 passing a request 1303 to delete the MNO profile to LPA 135 of primary device 100$^P$.

LPA 135 of primary device 100$^P$ determines if a deletion code is already stored in smart card 110$^P$ (block 1205). Upon receipt of the request to delete the current MNO profile, LPA 135 sends an inquiry to smart card 110$^P$ requesting whether there already is a deletion code stored in smart card memory 140 of smart card 110$^P$. For example, a deletion code may have been delivered to smart card 110$^P$ by the manufacturer and stored in smart card memory 140. As another example, the customer/user 155 may have used a camera of companion device 100$^C$ or primary device 100$^P$ to scan a Quick Response (QR) code that encodes a deletion code, and the decoded deletion code may have been stored in smart card memory 140. As a further example, companion device 100$^C$ or primary device 100$^P$ may have been placed in proximity to a deletion code delivery device that transmits, via Near Field Communication (NFC) protocols, a deletion code to companion device 100$^C$ or primary device 100$^P$ where it is then stored in smart card memory 140. FIG. 13A depicts LPA 135 of primary device 100$^P$ determining 1305 if a deletion code is already stored in the smart card 110$^P$ of primary device 100$^P$.

If the deletion code is already stored in memory 140 of smart card 110$^P$ (YES—block 1205), then the exemplary process continues at block 1255 (FIG. 12D) below with the deletion of the MNO profile from smart card memory 140. FIG. 13A depicts LPA 135 deleting 1308 the current MNO profile from smart card memory 140 if a deletion code is already stored in smart card 110$^P$. If a deletion code is not already stored in smart card 110$^P$ (NO—block 1205), then LPA 135 at primary device 100$^P$ sends a request to delete the MNO profile to subscription mgt node 120 (block 1207). In one implementation, the request to delete the MNO profile may include the smart card ID of the smart card 110$^P$ of the primary device 100$^P$, and/or the profile ID of the current MNO profile. FIG. 13A depicts LPA 135 at primary device 100$^P$ sending 1310 a request to delete the MNO profile to subscription mgt node 120 if a deletion code is not already stored in smart card memory 140 of smart card 110$^P$. Upon receipt of the request to delete the MNO profile, subscription mgt node 120 authenticates the customer/user 155, and responds with a CAPTCHA authentication request, as described with respect to the exemplary process of FIGS. 9A and 9B above.

LPA 135 of primary device 100$^P$, in response to the request for a deletion code, receives a CAPTCHA authentication request from subscription mgt node 120 (block 1210), and passes the CAPTCHA authentication request, via device processing unit 125 or modem/baseband processing unit 130, to primary device 100$^P$'s smart card security domain 150 (block 1213). FIG. 13A depicts companion device 100$^C$ receiving a CAPTCHA authentication request 1313 from subscription management node 120, and LPA 135 passing the CAPTCHA authentication request 1315 to security domain 150 of smart card 110$^P$.

CAPTCH app 160, executing within the primary device's smart card security domain 150, generates a random number (block 1215), and generates an image of the random number to produce a pre-CAPTCHA random number image (block 1217). Various different types of random number generating algorithms may be used by CAPTCHA app 160 to generate the random number. CAPTCHA app 160 may generate various different types of images (e.g., bmp, jpg, gif, etc.) for depicting the generated random number. FIG. 13A depicts the generation 1318 of the random number, and the generation 1320 of a pre-CAPTCHA image of the random number, within security domain 150 of smart card 110$^P$. CAPTCHA app 160, in companion device 100$^P$'s smart card security domain 150, passes the pre-CAPTCHA random number image to LPA 135 (block 1220), and LPA 135 of primary device 100$^P$ distorts the received pre-CAPTCHA random number image to produce a CAPTCHA image (block 1223). LPA 135 of primary device 100$^P$ sends the distorted CAPTCHA image to primary device 100$^P$'s user interface (UI) for display to customer/user 155 (block 1225). LPA 135 of primary device 100$^P$ receives a user CAPTCHA response based on the displayed CAPTCHA image (block 1228). FIG. 13A depicts smart card 110$^P$ passing 1325 the pre-CAPTCHA image of the random number to LPA 135 of primary device 100$^P$, LPA 135 at primary device 100$^P$ distorting 1330 the pre-CAPTCHA image to produce a CAPTCHA image, and primary device 100$^P$ displaying 1335 the distorted CAPTCHA image of the random number to customer/user 155. User/customer 155 may, upon viewing the distorted CAPTCHA image of the random number, enter, via a user interface of primary device 100$^P$, the random number. FIG. 8 depicts an example of the distorted CAPTCHA image of the random number being displayed to user/customer 155 via a display 810 of primary device 100$^P$. As shown in FIG. 8, a CAPTCHA response window 820 may be displayed in display 810 of primary device 100$^P$, wherein CAPTCHA response window 820 presents the CAPTCHA image 830 that includes the distorted image of the random number, and a CAPTCHA response box 840 that permits user/customer 155 to supply the random number presented via CAPTCHA image 830.

LPA 135, based on the received user CAPTCHA response, determines if the user/customer 155 has been successfully CAPTCHA authenticated (block 1230). Referring again to the example of FIG. 8, if user/customer 155 enters the correct number in CAPTCHA response box 840 that corresponds exactly to the random number depicted via distorted CAPTCHA image 830, then user/customer 155 is considered to be successfully CAPTCHA authenticated (i.e., the user is not a bot, or other automated entity). If LPA 135 at primary device 100$^P$ determines that user/customer 155 has failed to successfully CAPTCHA authenticate (NO—block 1230), then LPA 135 does not cause the MNO profile to be deleted from smart card memory 140 (block 1233). If LPA 135 of primary device 100$^P$ determines that user/customer 155 has successfully CAPTCHA authenticated (YES—block 1230), then LPA 135 sends a successful CAPTCHA authentication notification to subscription mgt node 120 (block 1235). FIG. 13A depicts primary device 100$^P$ sending a successful CAPTCHA authentication notification 1340 to subscription mgt node 120.

Figure 13B:
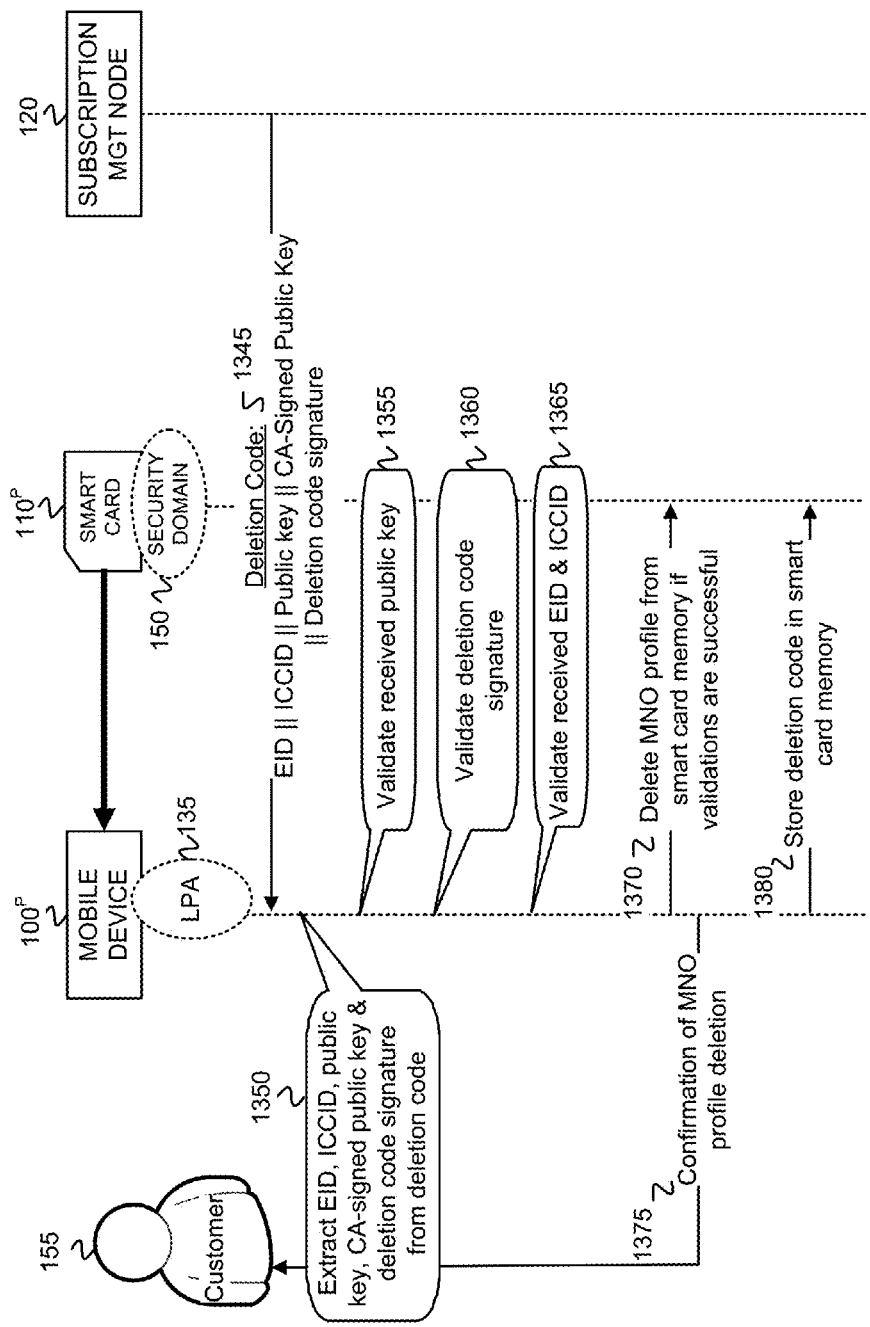

LPA 135 at primary device 100$^P$, in response to sending the successful CAPTCHA authentication notification, receives a deletion code issued from subscription mgt node 120 (block 1238). The deletion code generated by subscription mgt node 120 may include multiple components as described above with respect to the deletion code 500 of FIG. 5. As shown in FIG. 13B, the deletion code 1345 generated by subscription mgt node 120 may include the smart card ID (e.g., the EID), the profile ID (e.g., the ICCID), the public key of subscription mgt node 120, the CA-signed public key of subscription mgt node 120, and the deletion code signature, all concatenated together as a single string of data.

LPA 135 at primary device 100$^P$ extracts the smart card ID, the profile ID, the public key, the CA-signed public key, and the deletion code signature from the received deletion code (block 1240). Referring to the exemplary deletion code 500 of FIG. 5, upon receipt of the data string represented by deletion code 500, LPA 135 extracts the smart card ID data 510, the profile ID data 520, the subscription mgt node public key data 530, the CA-signed public key data 540, and the deletion code signature data 560 from deletion code 500. FIG. 13B depicts LPA 135 of primary device 100$^P$ extracting 1350 the EID, the ICCID, the public key, the CA-signed public key, and the deletion code signature from the deletion code 1345 received from subscription mgt node 120.

LPA 135 of primary device 100$^P$ validates the public key of subscription mgt node 120 extracted from the received deletion code (block 1243). Validation of the public key of subscription mgt node 120 may include LPA 135 comparing the public key against a Certificate Revocation List (CRL), the contents of which are maintained current by, for example, certificate authority 210 of the PKI system. Whenever CA 210 revokes a particular certificate, the corresponding public key is placed in the CRL for future lookup. In one implementation, LPA 135 sends a message to CA 210, containing the public key of subscription mgt node 120, and CA 210 returns a message, after performing a lookup into the CRL, that indicates whether the public key has been revoked. If the public key of subscription mgt node 120 is found in the CRL, the public key is determined by LPA 135 to not be successfully validated. If the public key is not found in the CRL, then the public key is determined by LPA 135 to be successfully validated.

LPA 135 of primary device 100$^P$ validates the deletion code signature extracted from the received deletion code (block 1245). Validation of the deletion code signature may include using a signature verifying algorithm that is the counterpart to the signature generation algorithm used by subscription mgt node 120 to generate the deletion code signature based on subscription mgt node 120's private key. The signature verifying algorithm uses the public key to derive the original block of data that was signed with the signature generation algorithm using the private key of the public/private key pair. LPA 135 uses the subscription mgt node 120's public key, extracted from data 530 of deletion code 500, and applies the signature verifying algorithm to the deletion code signature 560 extracted from deletion code 500. LPA 135 takes the block of data that results from application of the signature verifying algorithm, breaks the block of data into its original smart card ID, profile ID, public key, and CA-signed public key components, and compares each of those components with the appropriate data (e.g., 510, 520, 530, and 540) of the received deletion code 500. If a component-by-component comparison of the data indicates that each component of the block of data matches a corresponding component of the received deletion code 500, then LPA 135 considers the deletion code signature to be validated. FIG. 13B depicts LPA 135 validating 1355 the received public key, and then validating 1360 the deletion code signature.

LPA 135 of primary device 100$^P$ validates the smart card ID and the profile ID extracted from the received deletion code (block 1248). Validation of the smart card ID and the profile ID may include, for example, comparing the smart card ID extracted from the deletion code with the smart card ID stored in smart card memory 140 of primary device 100$^P$ to determine if they match, and comparing the profile ID extracted from the deletion code with the profile ID stored in smart card memory 140 of primary device 100$^P$ to determine if they match. The validation of the smart card ID and the profile ID is considered successful if the smart card ID and the profile ID extracted from the deletion code match those stored in smart card memory 140 of smart card 110$^P$. FIG. 13B depicts LPA 135 validating 1365 the smart card ID (e.g., the EID) and the profile ID (e.g., the ICCID).

Figure 12A:
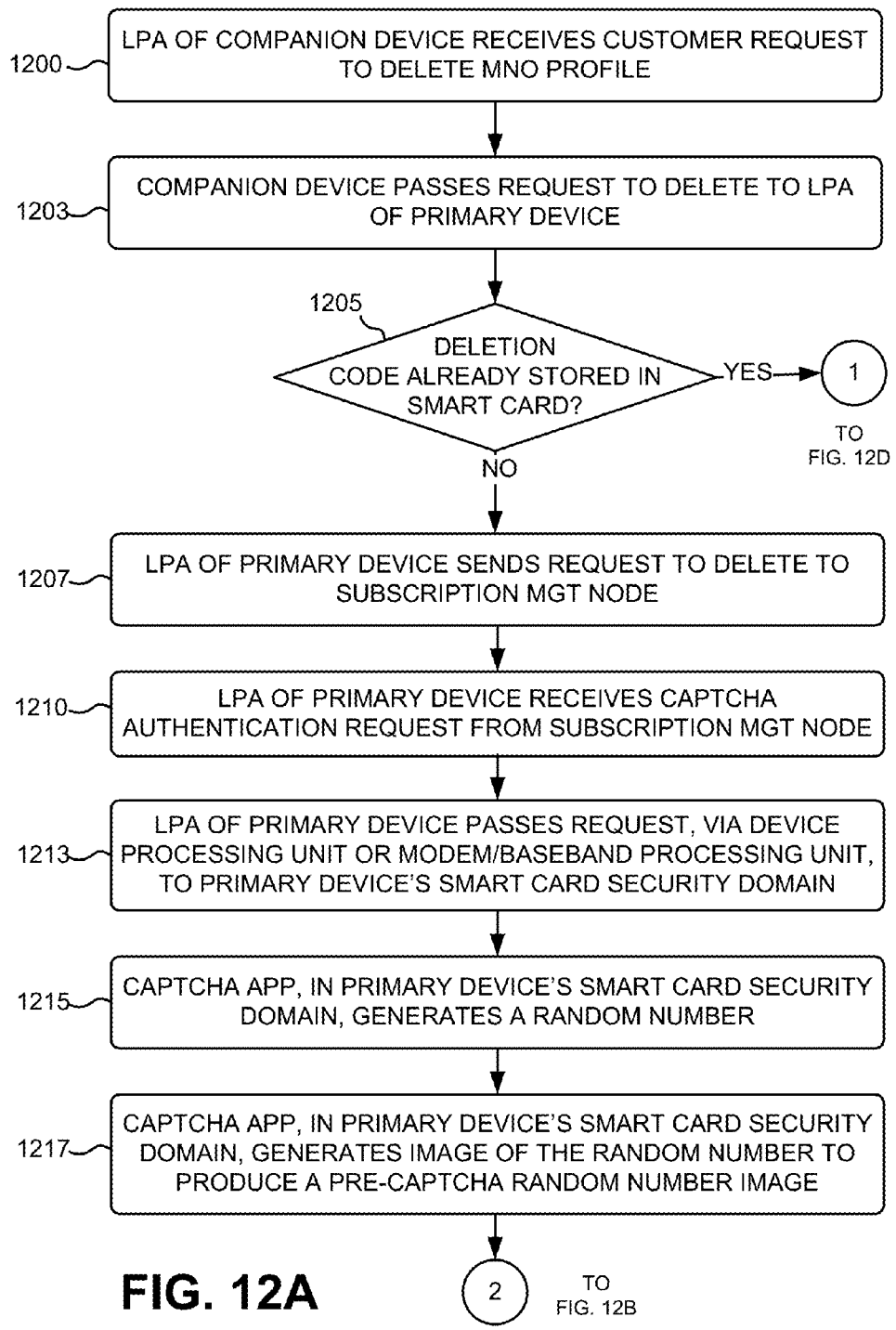
FIGS. 12A-12D are flow diagrams illustrating an exemplary process for obtaining a profile deletion code, to enable a Mobile Network Operator profile to be deleted via use of a companion device, based on CAPTHCA authentication of a user/customer, where the companion device is connected to a primary device via a wired or wireless connection, the companion device does not include a smart card, and the MNO profile is stored in a smart card of the primary device.
Figure 12B:
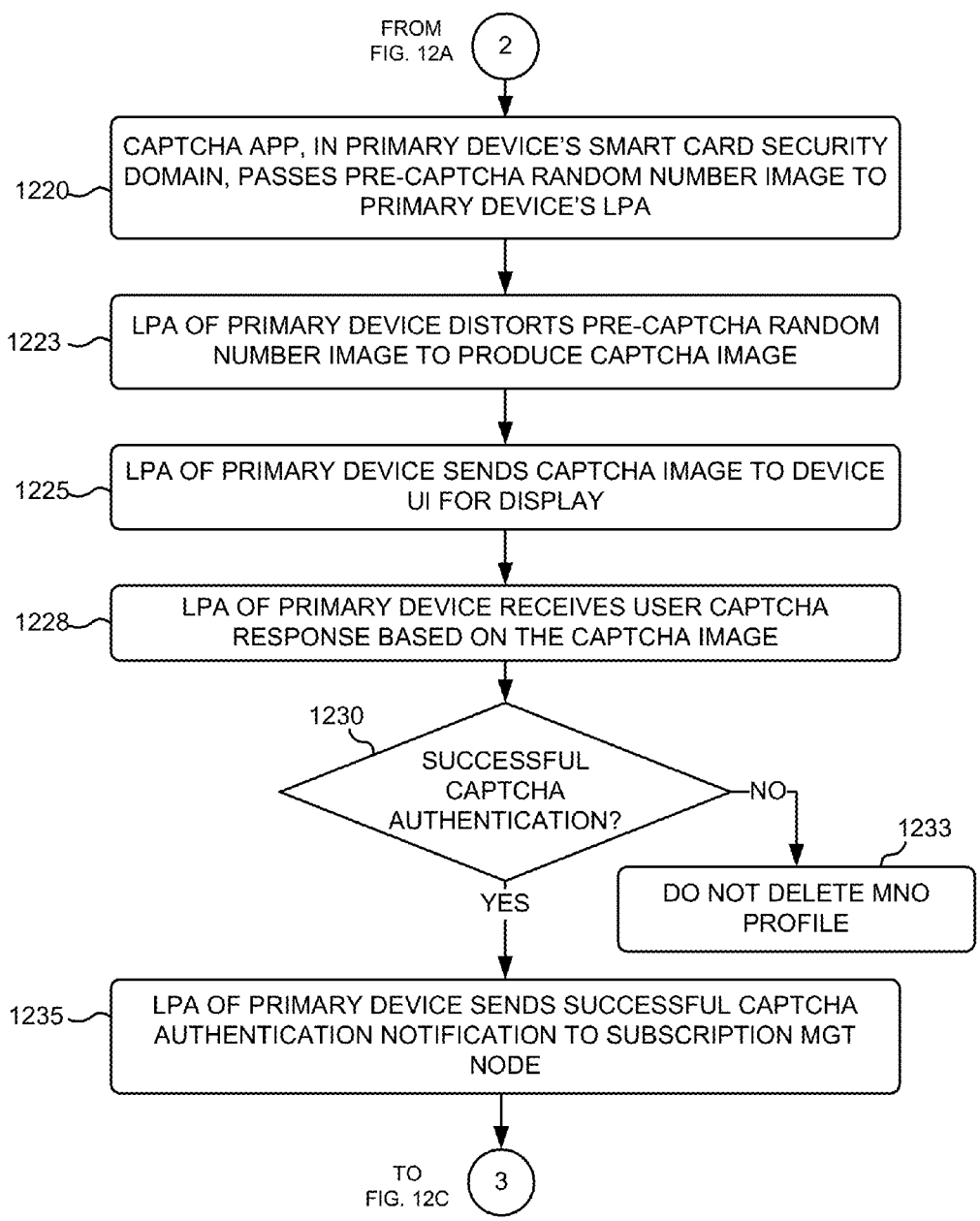
Figure 12C:
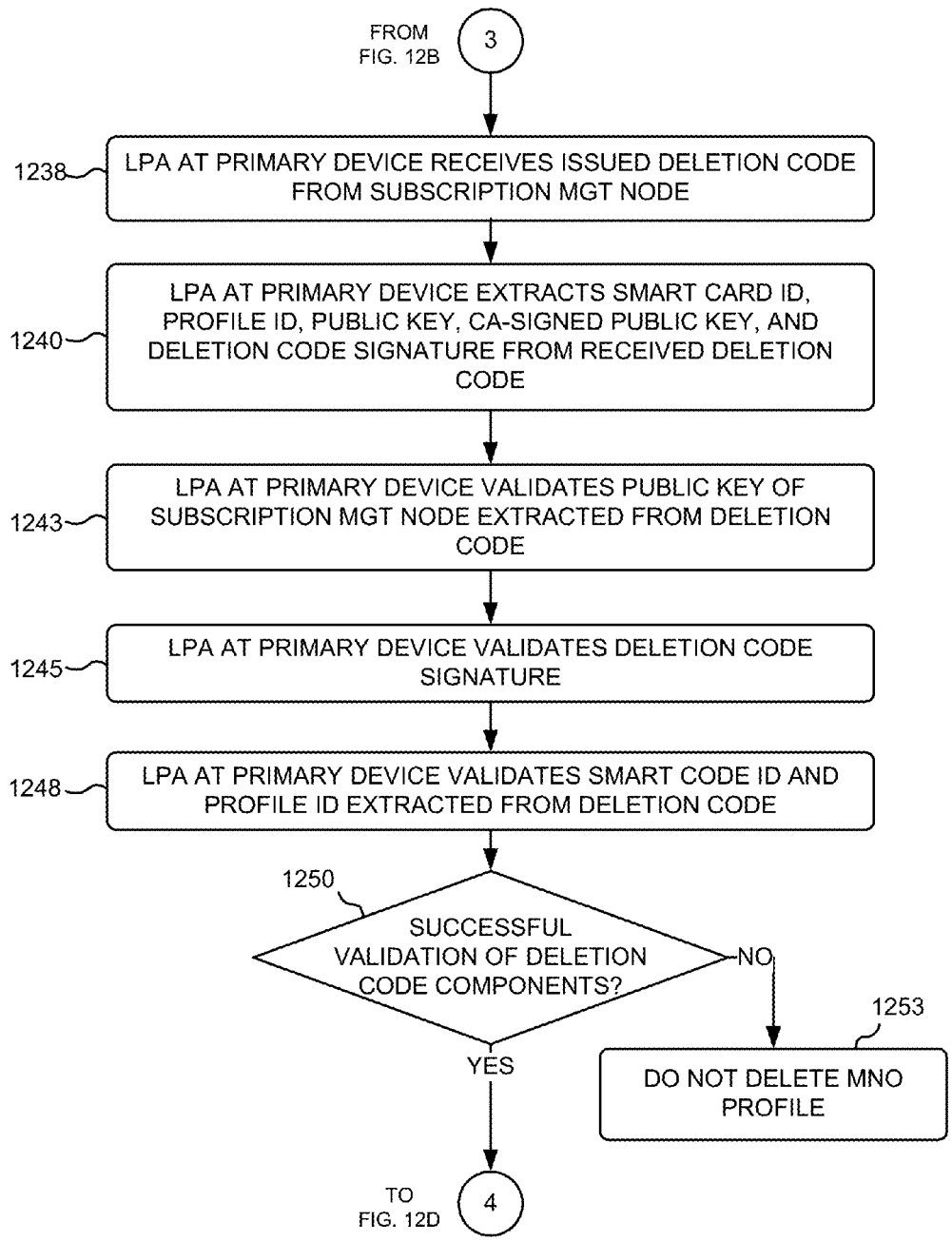
Figure 12D:
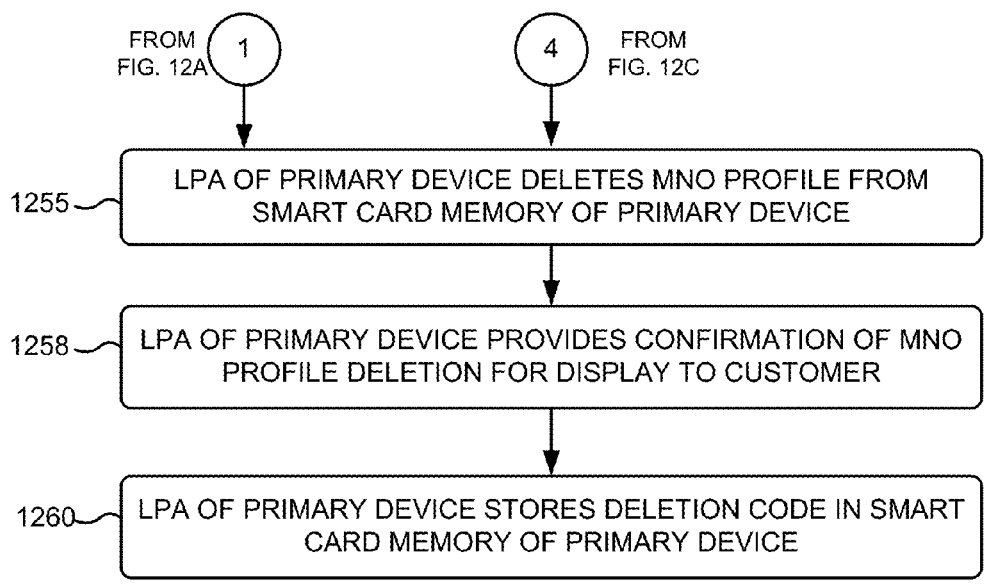

LPA 135 of primary device 100$^P$ determines if the deletion code components have been successfully validated (block 1250). If the deletion code components have each been successfully validated in blocks 1243, 1245, and 1248 of FIG. 12C, then the received deletion code is considered to be successfully validated. If the deletion code components (blocks 1243, 1245 and 1248) have not been successfully validated (NO—block 1250), then the LPA 135 does not cause the MNO profile to be deleted from memory 140 at primary device 100$^P$ (block 1253). If the deletion code components (blocks 1243, 1245, and 1248) have been successfully validated (YES—block 1250), then the LPA 135 of primary device 100$^P$ causes the MNO profile to be deleted from smart card memory 140 of smart card 110$^P$ (FIG. 12D, block 1255). LPA 135 sends an instruction to smart card 110$^P$ to delete the MNO profile, and processing unit 410 of smart card 110$^P$ deletes the MNO profile from smart card memory 140. FIG. 13B depicts LPA 135 of primary device 100$^P$ causing the MNO profile to be deleted 1370 from smart card memory 140 if the validations of blocks 1243, 1245 and 1248 are successful.

LPA 135 provides a confirmation of the MNO profile deletion to user/customer 155 (block 1258). The provided confirmation may include, for example, a visual confirmation (e.g., a notification message upon a display of companion device 100$^C$ or primary device 100$^P$), an audio confirmation (e.g., a notification sound via a speaker of companion device 100$^C$ or primary device 100$^P$), and/or an audiovisual confirmation (e.g., both the visual notification message accompanied with the notification sound). FIG. 13B depicts LPA 135 providing a confirmation 1375, via a display of companion device 100$^C$ or primary device 100$^P$, of deletion of the current MNO profile from smart card memory 140 of primary device 100$^P$. LPA 135 may cause the deletion code to be stored in smart card memory 140 of smart card 110$^P$ (block 1260). FIG. 13B depicts LPA 135 causing the deletion code to be stored 1380 in smart card memory. The deletion code may be stored in smart card memory 140 of smart card 110$^P$ for future use in smart card memory operations, such as, for example, deleting one or more subsequent, new or updated MNO profiles from smart card memory 140.

The exemplary process of FIGS. 12A-12D may be repeated for each customer request to delete a MNO profile, received from user/customer 155 at companion device 100.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A-6D; FIGS. 9A and 9B; FIGS. 10A-10D; and FIGS. 12A-12D, and message flows with respect to FIGS. 1A, 1B, 7A-7B, 11A-11B, 13A-13B, the order of the blocks and/or message flows may be varied in other implementations. Additionally, though provision and validation of the deletion code has been described herein for purposes of deleting an MNO profile from smart card memory 140, the deletion code (i.e., additionally referred to as a "profile management code") may also be used for other LPA commands and/or smart card memory operations. For example, the provision and successful validation of the deletion code may control the enabling, disabling, and/or downloading of MNO profiles in smart card memory 140 (e.g., LPA enable, disable, and/or download commands). As another example, the provision and successful validation of the deletion code may control a smart card memory reset, such as an eUICC memory reset LPA command.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
   receiving a request from a user to manage a Mobile Network Operator (MNO) profile stored in a memory of a smart card within a device, wherein the MNO profile comprises one or more network access credentials for accessing a wireless network;

performing a Completely Automated Public Turing Test to tell Computers and Humans Apart (CAPTCHA), wherein the CAPTCHA includes receiving input from the user;
authenticating the user as a human, and not a bot or other automated activity, based on the CAPTCHA and the input from the user;
receiving, from a network node external to the device responsive to the authenticating, an MNO profile management code;
extracting, from the received MNO profile management code, a smart card identifier (ID) and a profile ID;
validating the smart card ID and the profile ID; and
deleting, based upon successful validation of the smart card ID and the profile ID, the MNO profile from the memory of the smart card.

2. The method of claim 1, wherein the request to manage the MNO profile is received via a user interface of the device.

3. The method of claim 1, wherein the method further comprises:
storing a new MNO profile in the memory of the smart card within the device to replace the deleted MNO profile.

4. The method of claim 1, further comprising:
sending, from the device to the network node, a request for MNO profile management based on receiving the request from the user to manage the MNO profile; and
receiving, at the device from the network node, a CAPTCHA authentication request,
wherein the CAPTCHA is performed responsive to receiving the CAPTCHA authentication request.

5. The method of claim 1, further comprising:
extracting, from the received MNO profile management code, a code signature;
extracting, from the received MNO profile management code, a public key of the network node; and
validating the code signature and the public key,
wherein the deleting of the MNO profile is further based upon successful validation of the code signature and the public key.

6. The method of claim 5, wherein the MNO profile management code comprises a string of data that further comprises multiple concatenated data components, and
wherein the code signature comprises a signature generated by applying a signature algorithm to two or more of the multiple concatenated data components of the MNO profile management code.

7. The method of claim 1,
wherein the profile ID comprises an Integrated Circuit Card ID (ICCID) associated with the MNO profile.

8. The method of claim 1, wherein the smart card ID comprises an embedded Universal Integrated Circuit Card (eUICC) ID associated with the smart card.

9. The method of claim 1, further comprising:
providing, upon deletion of the MNO profile from the memory of the smart card, a confirmation of the deletion to the user of the device.

10. A device, comprising:
a microprocessor smart card configured to store a Mobile Network Operator (MNO) profile for the device, wherein the MNO profile comprises one or more network access credentials for accessing a wireless network;
a communication interface configured to connect to the wireless network; and
a processing unit, or logic, coupled to the microprocessor smart card and the communication interface, and configured to:
receive a request from a user to manage the MNO profile stored in the microprocessor smart card,
perform a Completely Automated Public Turing Test to tell Computers and Humans Apart (CAPTCHA), wherein the CAPTCHA includes receiving input from the user,
authenticate the user as a human, and not a bot or other automated activity, based on the CAPTCHA and the input from the user,
receive, via the communication interface from an external network node responsive to the authenticating, an MNO profile management code, and
extract, from the received MNO profile management code, a smart card identifier (ID) and a profile ID,
validate the smart card ID and the profile ID, and
delete, based upon successful validation of the smart card ID and the profile ID, the MNO profile from a memory of the microprocessor smart card.

11. The device of claim 10, wherein the smart card ID comprises an embedded Universal Integrated Circuit Card (eUICC) ID associated with the microprocessor smart card.

12. The device of claim 11, wherein the processing unit, or logic, is configured to:
store a new MNO profile in the memory of the microprocessor smart card to replace the deleted MNO profile.

13. The device of claim 10, wherein the processing unit, or logic, is further configured to:
send, from the device to the network node via the communication interface, a request for MNO profile management based on receiving the request from the user to manage the MNO profile; and
receive, at the device from the network node via the communication interface, a CAPTCHA authentication request,
wherein the CAPTCHA performed responsive to receiving the CAPTCHA authentication request.

14. The device of claim 10, wherein the processing unit, or logic, is further configured to:
extract, from the received MNO profile management code, a code signature;
extract, from the received MNO profile management code, a public key of the network node; and
validate the code signature and the public key,
wherein the deletion of MNO profile is further based upon successful validation of the code signature and the public key.

15. The device of claim 14, wherein the MNO profile management code comprises a string of data that further comprises multiple concatenated data components, and
wherein the code signature comprises a signature generated by applying a signature algorithm to two or more of the multiple concatenated data components of the MNO profile management code.

16. The device of claim 10, wherein the profile ID comprises an Integrated Circuit Card ID (ICCID) associated with the MNO profile.

17. A non-transitory storage medium storing instructions executable by a processing unit associated with a device, wherein the instructions comprise instructions to cause the processing unit to:
receive a request from a user to manage a Mobile Network Operator (MNO) profile stored in a smart card within a device, wherein the MNO profile comprises one or more network access credentials for accessing a wireless network;

perform a Completely Automated Public Turing Test to tell Computers and Humans Apart (CAPTCHA), wherein the CAPTCHA includes receiving input from the user;

authenticate the user as a human, and not a bot or other automated activity, based on the CAPTCHA and the input from the user;

receive, from a network node external to the device responsive to the authenticating, a MNO profile management code;

extract, from the received MNO profile management code, a smart card identifier (ID) and a profile ID;

validate the smart card ID and the profile ID; and delete, based upon successful validation of the smart card ID and the profile ID, the MNO profile from the smart card.

18. The non-transitory storage medium of claim 17, wherein the profile ID comprises an Integrated Circuit Card ID (ICCID) associated with the MNO profile.

19. The non-transitory storage medium of claim 17, wherein the instructions further comprise instructions to cause the processing unit to:
extract, from the received MNO profile management code, a code signature;
extract, from the received MNO profile management code, a public key of the network node; and
validate the code signature and the public key,
wherein the deletion of the MNO profile is further based upon successful validation of the code signature and the public key.

20. The non-transitory storage medium of claim 17, wherein the smart card ID comprises an embedded Universal Integrated Circuit Card (eUICC) ID associated with the smart card.

* * * * *